US012671983B2

(12) United States Patent
Li et al.

(10) Patent No.: US 12,671,983 B2
(45) Date of Patent: Jun. 30, 2026

(54) NON-SIMULTANEOUS TRANSMITTING AND RECEIVING CAPABILITY INDICATION METHOD, APPARATUS, AND SYSTEM

(71) Applicant: HUAWEI TECHNOLOGIES CO., LTD., Shenzhen (CN)

(72) Inventors: Yunbo Li, Shenzhen (CN); Yuchen Guo, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 311 days.

(21) Appl. No.: 18/496,228

(22) Filed: Oct. 27, 2023

(65) Prior Publication Data

US 2024/0056796 A1    Feb. 15, 2024

Related U.S. Application Data

(63) Continuation of application No. PCT/CN2022/086676, filed on Apr. 13, 2022.

(30) Foreign Application Priority Data

Apr. 30, 2021    (CN) .......................... 202110485829.5

(51) Int. Cl.
*H04W 8/24* (2009.01)
*H04W 76/15* (2018.01)

(52) U.S. Cl.
CPC .............. *H04W 8/24* (2013.01); *H04W 76/15* (2018.02)

(58) Field of Classification Search
CPC ....... H04L 1/0001; H04L 1/02; H04L 1/1614; H04W 36/06; H04W 36/20; H04W 76/15; H04W 76/20; H04W 8/24; H04W 84/12
See application file for complete search history.

(56) References Cited

U.S. PATENT DOCUMENTS

2020/0288523 A1    9/2020    Patil et al.
2021/0076413 A1    3/2021    Lu et al.
(Continued)

FOREIGN PATENT DOCUMENTS

JP        2020169244 A    10/2020
JP        2024516002 A    4/2024
JP        2024521455 A    5/2024

OTHER PUBLICATIONS

IEEE P802.11ax/D8.0, Draft Standard for Information technology, Telecommunications and information exchange between systems Local and metropolitan area networks, Specific requirements, Part 11: Wireless LAN Medium Access Control (MAC) and Physical Layer (PHY) Specifications, Amendment 1: Enhancements for High Efficiency, WLAN, IEEE P802.11ax/D8.0, Oct. 2020, total 820 pages.

(Continued)

*Primary Examiner* — Kashif Siddiqui
(74) *Attorney, Agent, or Firm* — WOMBLE BOND DICKINSON (US) LLP

(57) ABSTRACT

This application relates to the field of wireless fidelity Wi-Fi technologies, and in particular, to a non-simultaneous transmitting and receiving capability indication method, an apparatus, and a system. In the method, a first multi-link device MLD may sequentially transmit an association request frame and a management frame to a second MLD. Correspondingly, the second MLD may receive the association request frame and the management frame from the first MLD. The association request frame includes first information, and the first information indicates a first NSTR capability between a first link and a second link. The management frame includes second information, and the second information indicates a second NSTR capability between the first link and the second link.

20 Claims, 8 Drawing Sheets

Energy leaked on the link 1 will block receiving on the link 1

(56) References Cited

U.S. PATENT DOCUMENTS

| 2022/0167444 | A1* | 5/2022 | Jang | ..................... | H04W 76/15 |
| 2023/0054755 | A1* | 2/2023 | Patil | ..................... | H04W 76/15 |

OTHER PUBLICATIONS

Edward Au (Huawei):"Compendium of straw polls and potential changes to the Specification Framework Document",IEEE Draft, 11-20-0566-99-00BE-Compendium-of-Straw-Polls-and-Potential-Changes-to-the-Specification-Framework-Document,Dec. 7, 2020,XP68175402,total 289 pages.
IEEE P802.11be™/D0.2, Dec. 2020, Part 11: Wireless LAN Medium Access Control (MAC) and Physical Layer (PHY) Specifications,Amendment 8:Enhancements for extremely high through-put (EHT),XP068241435,total 409 pages.
Yunbo Li et al: "Proposed Draft Text for MLO Multi-Link Channel Access: Capability Signaling." IEEE 802.11-20/1320r5. Date: Aug. 26, 2020, total 3 pages.
Dibakar Das et al: "CR for CIDs related to NSTR Capability signalling." IEEE 802.11-21/0222r6. Date: Feb. 21, 2021, total 6 pages.
Laurent Cariou:"Resolutions for CC34 CIDs for channel switching quieting." IEEE 802.11-20/0481r0. Date: Feb. 8, 2021, total 11 pages.
Yunbo Li et al: "Discussion about STR Capabilities Indication." IEEE 802.11-20/0921r4. Date: Jun. 20, 2020, total 17 pages.
Taewon Song et al: "Performance Analysis of Synchronous Multi-Radio Multi-Link MAC Protocols in IEEE 802.11be Extremely High Throughput WLANs", applied sciences, Dec. 30, 2020, total 27 pages.

* cited by examiner

Energy leaked on the link 1 will
block receiving on the link 1

NON-SIMULTANEOUS TRANSMITTING AND RECEIVING CAPABILITY INDICATION METHOD, APPARATUS, AND SYSTEM

CROSS-REFERENCE TO RELATED APPLICATIONS

This application is a continuation of International Application No. PCT/CN2022/086676, filed on Apr. 13, 2022, which claims priority to Chinese Patent Application No. 202110485829.5, filed on Apr. 30, 2021. The disclosures of the aforementioned applications are hereby incorporated by reference in their entireties.

TECHNICAL FIELD

This application relates to the communications field, and in particular, to a non-simultaneous transmitting and receiving capability indication method, an apparatus, and a system.

BACKGROUND

To achieve a technical objective of an extremely high throughput, a multi-link (ML) technology is used as one of key technologies in the Institute of Electrical and Electronics Engineers (IEEE) 802.11be standard. A multi-link device (MLD) that supports ML has a capability of transmitting and receiving on multiple frequency bands, to transmit data by using a larger bandwidth, thereby improving a throughput rate.

As shown in FIG. 1, the MLD may include multiple stations, and each station may establish a link with one station in another MLD for communication. In other words, two MLD devices can communicate with each other through multiple links. In the multiple links, when a frequency spacing between two links is small, transmitting a signal on one link may affect receiving a signal on the other link. Therefore, transmitting and receiving cannot be performed simultaneously on the two links, that is, non-simultaneous transmitting and receiving (NSTR) is between the two links.

Currently, when a station in a non-access point MLD (non-AP MLD) initiates an association request to a station in an AP MLD, NSTR capability information may be carried in an association request frame, to indicate whether NSTR is between a link corresponding to the station and another link of the non-AP MLD.

SUMMARY

This application provides a non-simultaneous transmitting and receiving capability indication method, an apparatus, and a system, to update an NSTR capability between links, so that two ends of communication have a consistent understanding of the NSTR capability between the links, thereby improving communication efficiency.

According to a first aspect, a non-simultaneous transmitting and receiving capability indication method is provided. The method may be performed by a first MLD, or may be performed by a component in the first MLD, such as a processor, a chip, or a chip system of the first MLD, or may be implemented by a logical module or software that can implement all or a part of functions of the first MLD. In this application, an example in which the first MLD performs the method is used for description. The method includes: The first MLD transmits an association request frame to a second MLD, and transmits a management frame to the second MLD. The association request frame includes first information, and the first information indicates first non-simultaneous transmitting and receiving NSTR capability between a first link and a second link. The management frame includes second information, and the second information indicates a second NSTR capability between the first link and the second link.

Based on this solution, the first MLD may report the first NSTR capability and the second NSTR capability that are between the first link and the second link to the second MLD. In some embodiments, the first MLD may report the NSTR capability between the first link and the second link to the second MLD for multiple times, so that the first MLD may notify the second MLD in time when the NSTR capability between the first link and the second link changes. In other words, the first MLD can indicate an updated NSTR capability between the first link and the second link to the second MLD. In this way, the first MLD and the second MLD can have a consistent understanding of an NSTR capability between links, thereby improving communication efficiency.

In some embodiments, that the first MLD transmits a management frame to a second MLD includes: When a channel switch occurs, the first MLD transmits the management frame to the second MLD, where the second NSTR capability is an NSTR capability between the first link and the second link after the channel switch.

In some embodiments, that the first MLD transmits a management frame to a second MLD includes: When a channel switch occurs and a first condition is not met, the first MLD transmits the management frame to the second MLD, where the second NSTR capability is an NSTR capability between the first link and the second link after the channel switch.

Based on the foregoing embodiments, in a channel switch scenario, the second MLD can learn of the NSTR capability after the channel switch, so that the first MLD and the second MLD can have a consistent understanding of the NSTR capability between links after the channel switch, thereby improving communication efficiency.

In some embodiments, the first condition includes at least one of the following: after the channel switch, one of a frequency band accessed by the first link and a frequency band accessed by the second link is in a 2.4 GHz frequency band, and the other is in a 5 GHz or 6 GHz frequency band; before the channel switch, STR is between the first link and the second link, and after the channel switch, a frequency spacing between the first link and the second link remains unchanged or increases; and before the channel switch, NSTR is between the first link and the second link, and after the channel switch, a frequency spacing between the first link and the second link remains unchanged or decreases.

In some embodiments, the first condition in the foregoing example is related to frequencies of links. In a process of a channel switch, the second MLD can learn of a target channel after the switch, so that determining of the first condition can also be performed by the second MLD side. Therefore, when the first condition is met, the second MLD can learn of the NSTR capability between the first link and the second link after the channel switch. In this scenario, the first MLD may not transmit the management frame, to reduce signaling overheads.

In some embodiments, that a frequency spacing between the first link and the second link remains unchanged or becomes larger after the channel switch includes: After the channel switch, the frequency spacing between the first link and the second link remains unchanged or becomes larger, and a relative relationship of frequencies of the first link and the second link remains unchanged. That a frequency spacing between the first link and the second link remains unchanged or becomes smaller after the channel switch includes: After the channel switch, the frequency spacing between the first link and the second link remains unchanged or becomes smaller, and a relative relationship of frequencies of the first link and the second link remains unchanged.

In some embodiments, that the first MLD transmits a management frame to a second MLD includes: After a channel switch announcement is received and before a channel switch is performed, the first MLD transmits the management frame to the second MLD, where the second NSTR capability is an NSTR capability between the first link and the second link after the channel switch.

In some embodiments, the first MLD can indicate, to the second MLD before the channel switch, the NSTR capability between the first link and the second link after the channel switch, so that the second MLD and the first MLD can communicate with each other as soon as possible based on the NSTR capability after the channel switch, thereby reducing a communication delay.

In some embodiments, the management frame further includes third information, and the third information indicates that the second NSTR capability is the NSTR capability between the first link and the second link after the channel switch.

In some embodiments, the second MLD can correctly understand the second NSTR capability, so that the second MLD does not understand the second NSTR capability as an NSTR capability before the channel switch.

In some embodiments, before the first MLD transmits a management frame to a second MLD, the method further includes: The first MLD transmits first operation mode control information to the second MLD, where the first operation mode control information indicates that a channel bandwidth of the first link changes, and a changed channel bandwidth is less than the channel bandwidth before changing.

In some embodiments, after the first MLD transmits a management frame to a second MLD, the method further includes: The first MLD transmits second operation mode control information to the second MLD, where the second operation mode control information indicates that a channel bandwidth of the first link changes, and a changed channel bandwidth is greater than the channel bandwidth before changing.

In some embodiments, a communication failure caused by that the first MLD and the second MLD have different understandings of the NSTR capability between the first link and the second link can be avoided to a maximum extent.

According to a second aspect, a non-simultaneous transmitting and receiving capability indication method is provided. The method may be performed by a second MLD, or may be performed by a component in the second MLD, such as a processor, a chip, or a chip system of the second MLD, or may be implemented by a logical module or software that can implement all or a part of functions of the second MLD. In this application, an example in which the second MLD performs the method is used for description. The method includes: The second MLD receives an association request frame from a first MLD, and receives a management frame from the first MLD. The association request frame includes first information, and the first information indicates first non-simultaneous transmitting and receiving NSTR capability between a first link and a second link. The management frame includes second information, and the second information indicates a second NSTR capability between the first link and the second link. For technical effects brought by the second aspect, refer to the technical effects brought by the first aspect. Details are not described herein again.

In some embodiments, before the second MLD receives the management frame from the first MLD, a channel switch occurs. The method further includes: The second MLD determines that NSTR is between the first link and the second link in a first time interval, where the first time interval is a time interval from a time point at which the channel switch occurs to a time point at which the management frame is received; or when a second condition is met, the second MLD determines that STR is between the first link and the second link in a first time interval; or when a third condition is met, the second MLD determines that NSTR is between the first link and the second link in a first time interval.

In some embodiments, the second condition includes at least one of the following: after the channel switch, one of a frequency band accessed by the first link and a frequency band accessed by the second link is in a 2.4 GHz frequency band, and the other is in a 5 GHz or 6 GHz frequency band; before the channel switch, STR is between the first link and the second link, and after the channel switch, a frequency spacing between the first link and the second link remains unchanged or increases. The third condition includes: Before the channel switch, NSTR is between the first link and the second link, and after the channel switch, a frequency spacing between the first link and the second link remains unchanged or becomes smaller.

In some embodiments, that a frequency spacing between the first link and the second link remains unchanged or becomes larger after the channel switch includes: After the channel switch, the frequency spacing between the first link and the second link remains unchanged or becomes larger, and a relative relationship of frequencies of the first link and the second link remains unchanged. That a frequency spacing between the first link and the second link remains unchanged or becomes smaller after the channel switch includes: After the channel switch, the frequency spacing between the first link and the second link remains unchanged or becomes smaller, and a relative relationship of frequencies of the first link and the second link remains unchanged.

In some embodiments, that the second MLD receives a management frame from the first MLD includes: After a channel switch announcement is transmitted and before a channel switch is performed, the second MLD receives the management frame from the first MLD, where the second NSTR capability is an NSTR capability between the first link and the second link after the channel switch.

In some embodiments, the management frame further includes third information, and the third information indicates that the second NSTR capability is the NSTR capability between the first link and the second link after the channel switch.

In some embodiments, before the second MLD receives a management frame from a first MLD, the method further includes: The second MLD receives first operation mode control information from the first MLD, where the first operation mode control information indicates a channel bandwidth of the first link, and a changed channel bandwidth is less than a channel bandwidth before changing.

In some embodiments, after the second MLD receives a management frame from a first MLD, the method further includes: The second MLD receives second operation mode control information from the first MLD, where the second operation mode control information indicates that a channel bandwidth of the first link changes, and a changed channel bandwidth is greater than the channel bandwidth before changing.

For technical effects brought by embodiments in the second aspect, refer to technical effects brought by a corresponding embodiment in the first aspect. Details are not described herein again.

With reference to the first aspect or the second aspect, in some embodiments, the management frame includes a multi-link element, the second information is carried in the multi-link element, and the multi-link element is a basic variant multi-link element or an update variant multi-link element.

With reference to the first aspect or the second aspect, in some embodiments, the multi-link element is a basic variant multi-link element, and the basic variant multi-link element includes a multi-link control field and a link information field.

The multi-link control field includes a first field, the first field is set to 0, and the first field includes at least one of the following: a multi-link device media access control address present field, a link identifier information present field, a change sequence present field, a multi-link device capability present field, or an enhanced multi-link single-radio frequency (EMLSR) capability present field.

The link information field includes an NSTR indication bitmap field. The second information is carried in the NSTR indication bitmap field. The link information field includes a second field. The second field is set to 0. The second field includes at least one of the following: a complete profile field, a media access control address present field, a beacon interval present field, or a delivery traffic indication map DTIM information present field.

With reference to the first aspect or the second aspect, in some embodiments, the multi-link element is an update variant multi-link element, and the update variant multi-link element includes a multi-link control field and a link information field.

The multi-link control field includes a type field. The type field is set to a first value. The multi-link control field does not include a first field. The first field includes at least one of the following: a multi-link device media access control address present field, a link identifier information present field, a change sequence present field, a multi-link capability present field, or an EMLSR capability present field.

The link information field includes an NSTR indication bitmap field. The second information is carried in the NSTR indication bitmap field. The link information field does not include a second field. The second field includes at least one of the following: a complete profile field, a station media access control address present field, a beacon interval present field, or a DTIM information present field.

With reference to the first aspect or the second aspect, in some embodiments, the link information field further includes an NSTR link pair present field and an NSTR bitmap size field. The NSTR link pair present field indicates that the link information field includes an NSTR indication bitmap field, and the NSTR bitmap size field indicates a size of the NSTR indication bitmap field.

With reference to the first aspect or the second aspect, in some embodiments, the management frame includes a third field. When a value of the third field is a first value, it indicates that the management frame is used to update the NSTR capability between the first link and the second link.

In some embodiments, a function of the management frame can be indicated to the second MLD, so that the second MLD can correctly interpret the management frame, to obtain the second NSTR capability between the first link and the second link.

According to a third aspect, a communication apparatus is provided, to implement the foregoing methods. The communication apparatus may be the first MLD in the first aspect, an apparatus including the first MLD, or an apparatus included in the first MLD, such as a chip; or the communication apparatus may be the second MLD in the second aspect, an apparatus including the second MLD, or an apparatus included in the second MLD, such as a chip. The communication apparatus includes a corresponding module, unit, or means for implementing the foregoing method. The module, unit, or means may be implemented by hardware, software, or hardware executing corresponding software. The hardware or the software includes one or more modules or units corresponding to the foregoing functions.

In some embodiments, the communication apparatus may include a transmitting module and/or a receiving module. Further, the communication apparatus may include a processing module. The transmitting module may be configured to implement a transmitting type function in any one of the foregoing aspects and any one of the embodiments of the foregoing aspects. The receiving module may be configured to implement a receiving type function in any one of the foregoing aspects and any one of the embodiments of the foregoing aspects. The processing module may be configured to implement a processing function in any one of the foregoing aspects and any one of the embodiments of the foregoing aspects.

According to a fourth aspect, a communication apparatus is provided. The apparatus includes a processor and a memory. The memory is configured to store computer instructions. When the processor executes the instructions, the communication apparatus is enabled to perform the method according to any one of the foregoing aspects. The communication apparatus may be the first MLD in the first aspect, an apparatus including the first MLD, or an apparatus included in the first MLD, such as a chip; or the communication apparatus may be the second MLD in the second aspect, an apparatus including the second MLD, or an apparatus included in the second MLD, such as a chip.

According to a fifth aspect, a communication apparatus is provided. The communication apparatus includes a processor and a communication interface. The communication interface is configured to communicate with a module other than the communication apparatus. The processor is configured to execute a computer program or instructions, so that the communication apparatus performs the method according to any one of the foregoing aspects. The communication apparatus may be the first MLD in the first aspect, an apparatus including the first MLD, or an apparatus included in the first MLD, such as a chip; or the communication apparatus may be the second MLD in the second aspect, an apparatus including the second MLD, or an apparatus included in the second MLD, such as a chip.

According to a sixth aspect, a communication apparatus is provided. The communication apparatus includes a logic circuit and an interface circuit. The interface circuit is configured to input information and/or output information. The logic circuit is configured to perform the method in any one of the foregoing aspects, to process input information and/or generate output information. The communication apparatus may be the first MLD in the first aspect, an apparatus including the first MLD, or an apparatus included in the first MLD, such as a chip; or the communication apparatus may be the second MLD in the second aspect, an apparatus including the second MLD, or an apparatus included in the second MLD, such as a chip.

With reference to the sixth aspect, in an embodiment of the sixth aspect, when the communication apparatus is configured to implement the function of the first MLD:

In some embodiments, the input information is an association request frame and a management frame, where the association request frame includes first information, the first information indicates a first NSTR capability between a first link and a second link, the management frame includes second information, and the second information indicates a second NSTR capability between the first link and the second link.

In some embodiments, the input information is first operation mode control information, where the first operation mode control information indicates that a channel bandwidth of the first link changes, and a changed channel bandwidth is less than the channel bandwidth before changing.

In some embodiments, the input information is second operation mode control information, where the second operation mode control information indicates that a channel bandwidth of the first link changes, and a changed channel bandwidth is greater than the channel bandwidth before changing.

With reference to the sixth aspect, in an embodiment of the sixth aspect, when the communication apparatus is configured to implement the function of the second MLD:

In some embodiments, the output information is an association request frame and a management frame, where the association request frame includes first information, the first information indicates a first NSTR capability between a first link and a second link, the management frame includes second information, and the second information indicates a second NSTR capability between the first link and the second link.

In some embodiments, the output information is first operation mode control information, where the first operation mode control information indicates that a channel bandwidth of the first link changes, and a changed channel bandwidth is less than the channel bandwidth before changing.

In some embodiments, the output information is second operation mode control information, where the second operation mode control information indicates that a channel bandwidth of the first link changes, and a changed channel bandwidth is greater than the channel bandwidth before changing.

According to a seventh aspect, a communication apparatus is provided. The communication apparatus includes an interface circuit and a processor. The interface circuit is a code/data read/write interface circuit. The interface circuit is configured to receive computer-executable instructions (where the computer-executable instructions are stored in a memory, and may be directly read from the memory, or may be read via another component) and transmit the computer-executable instructions to the processor. The processor is configured to execute the computer-executable instructions, so that the communication apparatus to perform the method according to any one of the foregoing aspects. The communication apparatus may be the first MLD in the first aspect, an apparatus including the first MLD, or an apparatus included in the first MLD, such as a chip; or the communication apparatus may be the second MLD in the second aspect, an apparatus including the second MLD, or an apparatus included in the second MLD, such as a chip.

According to an eighth aspect, a communication apparatus is provided. The communication apparatus includes at least one processor. The processor is configured to execute a computer program or instructions, so that the communication apparatus performs the method according to any one of the foregoing aspects. The communication apparatus may be the first MLD in the first aspect, an apparatus including the first MLD, or an apparatus included in the first MLD, such as a chip; or the communication apparatus may be the second MLD in the second aspect, an apparatus including the second MLD, or an apparatus included in the second MLD, such as a chip. In some embodiments, the communication apparatus includes a memory, and the memory is configured to store a computer program or instructions. The memory may be coupled to the processor, or may be independent of the processor.

In some embodiments, the communication apparatus may be a chip or a chip system.

When the apparatus is a chip system, the chip system may include a chip, or may include a chip and another discrete device.

According to a ninth aspect, a computer-readable storage medium is provided. The computer-readable storage medium stores a computer program or instructions. When the computer program or the instructions are executed by a processor, the method according to any one of the foregoing aspects is performed.

According to a tenth aspect, a computer program product is provided. When the computer program product is executed by a processor, the method according to any one of the foregoing aspects is performed.

It may be understood that, when the communication apparatus according to any one of the third aspect to the tenth aspect is a chip, the transmitting action/function may be understood as outputting information, and the receiving action/function may be understood as inputting information.

For technical effects brought by any one of the embodiments of the third aspect to the tenth aspect, refer to technical effects brought by different embodiments of the first aspect or the second aspect. Details are not described herein again.

According to an eleventh aspect, a communication system is provided. The communication system includes the first MLD and the second MLD according to the foregoing aspects.

DESCRIPTION OF EMBODIMENTS

Figure 1:
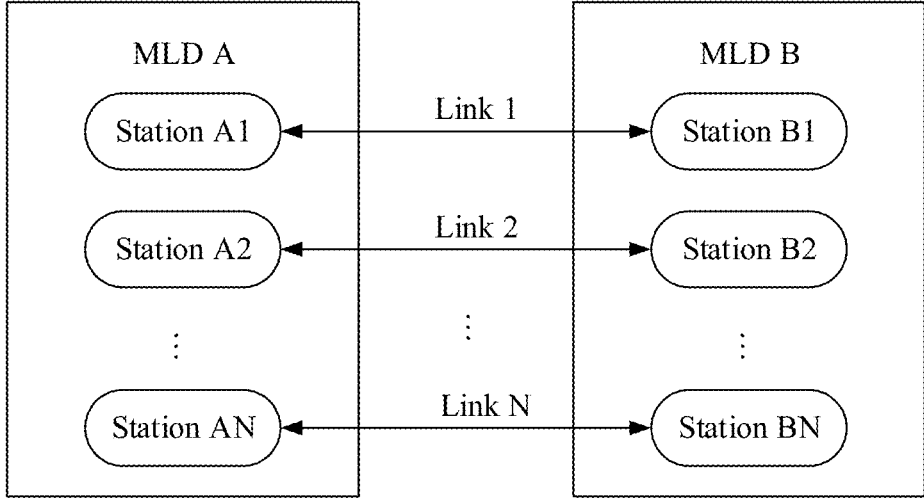
FIG. 1 is a schematic diagram of a multi-link device communication scenario according to this application.

Unless otherwise specified, "I" in the descriptions of embodiments of this application represents an "or" relationship between associated objects. For example, A/B may represent A or B. In this application, "and/or" describes only an association relationship for describing associated objects and represents that three relationships may exist. For example, A and/or B may represent the following three cases: Only A exists, both A and B exist, and only B exists. A and B may be singular or plural.

In descriptions of this application, unless otherwise specified, "multiple" means two or more than two. At least one of the following items (pieces) or a similar expression thereof refers to any combination of these items, including any combination of singular items (pieces) or plural items (pieces). For example, at least one of a, b, or c may represent a, b, c, a-b, a-c, b-c, or a-b-c, where a, b, and c may be singular or plural.

In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a manner for ease of understanding.

It may be understood that "an embodiment" mentioned in the entire specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments by using any appropriate manner. It may be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

It may be understood that, in this application, "when" and "if" mean that corresponding processing is performed in an objective situation, are not intended to limit a time, do not require a determining action during implementation, and do not mean any other limitation.

It may be understood that "predefine" in this application may be understood as "define", "predefine", "store", "pre-store", "pre-negotiate", "pre-configure", "build into", or "pre-burn".

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

In this application, unless otherwise specified, for same or similar parts of the embodiments, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method according to an internal logical relationship thereof. The following implementations of this application are not intended to limit the protection scope of this application.

For ease of understanding of the technical solutions in embodiments of this application, the technologies related to this application are first briefly described as follows:

1. Multi-Link (ML):

A technical objective of development and evolution of a cellular network and a wireless local area network (WLAN) is to continuously increase a throughput. Protocols of WLAN systems are mainly discussed in the Institute of Electrical and Electronics Engineers (IEEE) 802.11 standard group. In standards of 802.11a/b/g/n/ac/ax and the like, a throughput rate of the WLAN system is continuously improved. A next-generation standard IEEE 802.11be is referred to as an extremely high throughput (EHT) standard, and its most important technical objective is to significantly improve a peak throughput rate.

To achieve the technical objective of extremely high throughput, IEEE 802.11be uses ML as one of its key technologies. A core idea is that a WLAN device that supports the next-generation IEEE 802.11 standard has a multi-band transmitting and receiving capability, so that a wider bandwidth can be used for data transmission. This significantly improves throughput. A spatial path for performing access and data transmission on one frequency band may be referred to as a link. Therefore, access and transmission on multiple frequency bands is an ML. In addition, multiple links are conducive to reducing a delay and improving robustness.

For example, the multiple frequency bands include but are not limited to a 2.4 GHz wireless fidelity (Wi-Fi) frequency band, a 5 GHz Wi-Fi frequency band, and a 6 GHz Wi-Fi frequency band.

In addition, access frequency bands of different links may be the same, that is, different links may be located at a same frequency band. In this case, different links may access different channels of the same frequency band, so as to perform data transmission on the different channels.

2. Multi-Link Device (MLD):

The multi-link device may be a WLAN device that supports multiple links at the same time. In other words, the multi-link device has a capability of transmitting and receiving on multiple frequency bands. Compared with a device that supports only single-link transmission, the multi-link device has higher transmission efficiency and higher throughput.

It should be noted that the multi-link device may also be referred to as a multi-band device. Certainly, the multi-link device may also have another name. This is not limited in this application.

The multi-link device includes at least two affiliated stations (affiliated STA). The affiliated station may be an access point station (AP STA) or a non-access point station (non-AP STA).

For ease of description, in this application, a multi-link device whose affiliated station is an AP STA is referred to as an AP multi-link device (AP MLD), a multi-link AP, or a multi-link AP device, and a multi-link device whose affiliated station is a non-AP STA is referred to as a non-AP multi-link device (non-AP MLD), a multi-link STA, a multi-link STA device, or a STA multi-link device (STA MLD).

A STA in a multi-link device may establish a link with a STA in another multi-link device for communication. Refer to a schematic diagram shown in FIG. 1.

Multi-link devices can be classified into simultaneous transmitting and receiving (STR) multi-link devices (STR MLDs) and non-simultaneous transmitting and receiving (NSTR) multi-link devices (non-STR MLDs). A WLAN system including a non-STR MLD may be referred to as a non-STR multi-link system.

Figure 2:
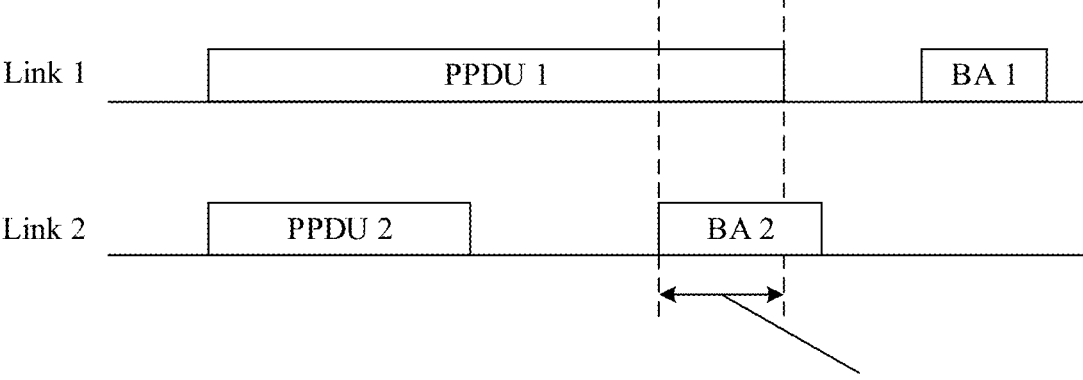
FIG. 2 is a schematic diagram of a non-simultaneous transmitting and receiving communication scenario of two links according to this application.

At least two links in multiple links of the non-STR MLD cannot perform simultaneous transmitting or receiving. For example, as shown in FIG. 2, in multiple links established between a non-STR MLD and another multi-link device, if a frequency spacing between a link 1 and a link 2 is small, when time of transmitting a block acknowledgment (BA) 2 for a physical layer protocol data unit (PPDU) 2 on the link 2 overlaps with time of receiving a PPDU 1 on the link 1, energy leaked on the link 1 in a process of transmitting the BA 2 on the link 2 blocks receiving of the PPDU 1 on the link 1. Therefore, receiving of the PPDU 1 is affected.

3. Association Request:

When a non-AP MLD accesses a network, a station in the non-AP MLD may initiate an association request to an AP MLD station to access a WLAN. In this process, the station in the non-AP MLD may transmit an association request frame, where the association request frame includes a basic variant multi-link element, and the basic variant multi-link element may indicate whether simultaneous transmitting and receiving can be performed between multiple links of the non-AP MLD.

Figure 3:
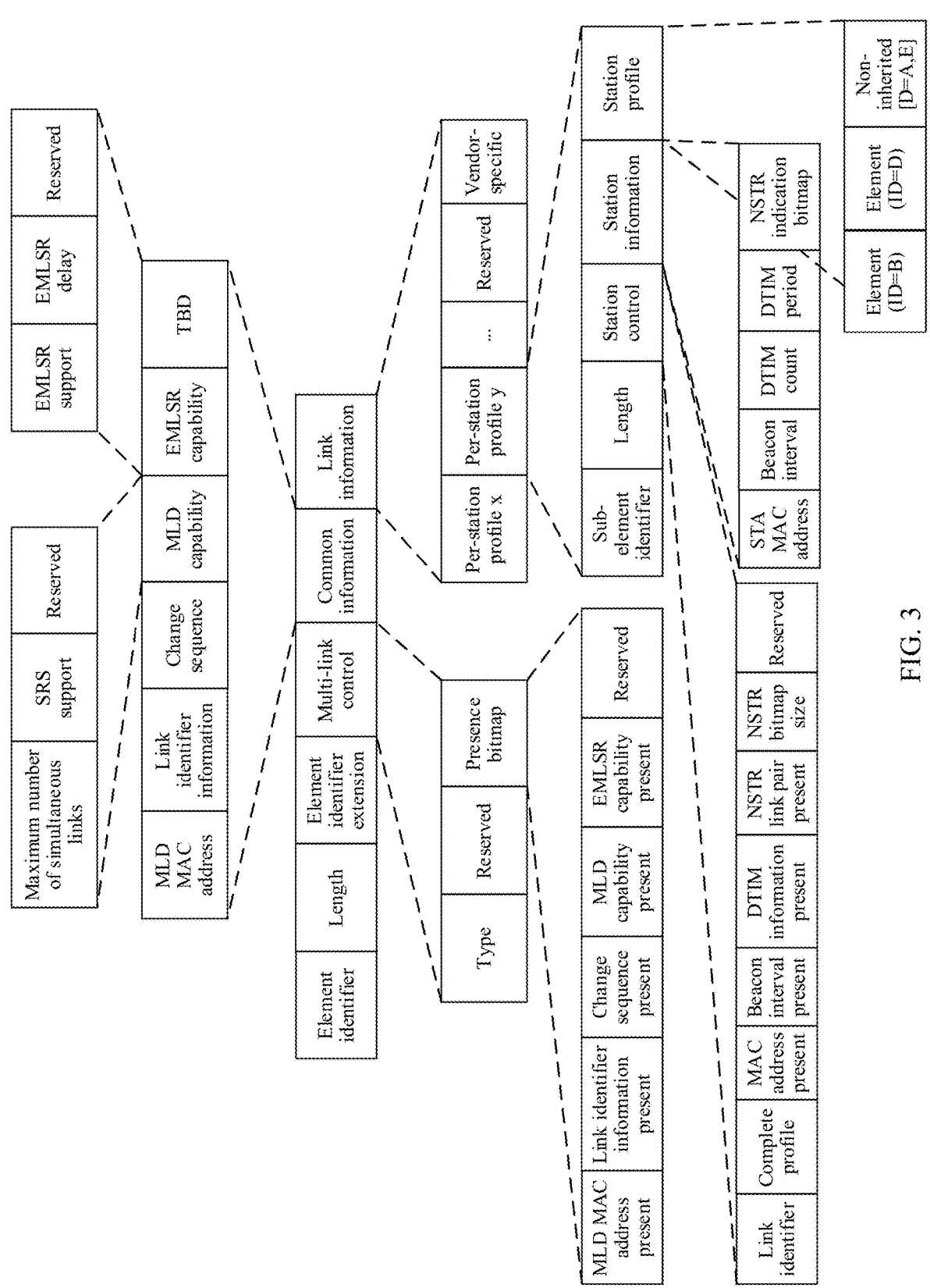
FIG. 3 is a schematic diagram of a frame structure of a basic variant multi-link element according to this application.

In an example, a frame structure of the basic variant multi-link element may be shown in FIG. 3. Refer to FIG. 3. The basic variant multi-link element includes an element identifier (element ID) field, a length field, an element identifier extension (Element ID Extension) field, a multi-link control field, a common information (Common Info) field, and a link information (Link info) field.

The element identifier field and the element identifier extension field are used to identify the basic variant multi-link element. Element identifier fields and element identifier extension fields of different basic variant multi-link elements are different. Usually, the element identifier field may be set to 255, and the element identifier extension field is set to a value that is not used by another basic variant multi-link element. The length field indicates a length of the basic variant multi-link element.

The multi-link control field carries multi-link control information, and may include a type field, a reserved field, and a presence bitmap field. The presence bitmap field may include one or more present fields. For example, the presence bitmap field may include:

a multi-link device media access control (MAC) address present (MLD MAC Address Present) field that indicates whether an MLD MAC address field is present in a common information field;

a link identifier information present (Link ID Info Present) field that indicates whether a link identifier information field is present in the common information field;

a change sequence present field that indicates whether a change sequence field is present in the common information field;

a multi-link device capabilities present (MLD Capabilities Present) field that indicates whether a multi-link device capability field is present in the common information field, where the multi-link device capability field includes a maximum number of simultaneous links field, a single-response scheduling (SRS) support field, and a reserved field; and an enhanced multi-link single radio frequency (EMLSR) capabilities present field that indicates whether an EMLSR capability field is present in the common information field, where the EMLSR capability field includes an EMLSR support field, an EMLSR delay field, and a reserved field.

The common information field may further include a to-be-determined (TBD) field in addition to the field indicated by the present field.

The link information field carries link information, and may include per-STA profile sub-elements. The per-STA profile sub-elements may be in a one-to-one correspondence with stations of the multi-link device. In some embodiments, the link information field may further include a vendor-specific sub-element.

The per-STA profile sub-element may include a sub-element identifier (Subelement ID) field, a length field, a station control (STA Control) field, a station information (STA Info) field, and a station profile (STA Profile) field. The station profile field may include zero or multiple elements (Elements).

The sub-element identifier field identifies the per-STA profile sub-element, and the sub-element identifier field is usually set to 0. The length field indicates a length of the per-STA profile sub-element.

The station control field may include:

a link identifier (Link ID) field that identifies a link corresponding to the per-STA profile sub-element including the station control field;

a complete profile field that indicates whether the basic variant multi-link element includes complete information of the link corresponding to the per-STA profile sub-element;

a MAC address present field that indicates whether a STA MAC address field is present in the station information field;

a beacon interval present field that indicates whether a beacon interval field is present in the station information field;

a delivery traffic indication map (DTIM) information present (DTIM Info Present) field that indicates whether a DTIM count field and a DTIM period field are present in the station information field;

an NSTR link pair present field that indicates whether an NSTR indication bitmap field is present in the station information field, where the NSTR indication bitmap field may indicate whether simultaneous transmitting and receiving on the link corresponding to the per-STA profile sub-element in which the NSTR indication bitmap field is located and another link can be performed; and an NSTR bitmap size field that indicates a size of the NSTR indication bitmap field when the NSTR indication bitmap field is present in the station information field, where the size of the NSTR indication bitmap field may be, for example, 8 bits or 16 bits.

For the foregoing present fields, if the present field is set to 1, it usually indicates that the field indicated by the present field is present; and if the present field is set to 0, it usually indicates that the field indicated by the present field is not present.

It should be noted that a "present field" in this application may also be referred to as a "presence field", and the "present field" and the "presence field" may be interchangeably used. This is not limited in this application.

The foregoing describes the frame structure of the basic variant multi-link element and functions of some fields. For descriptions of other fields, refer to definitions in the IEEE 802.11be standard. Details are not described herein.

4. Channel Switch:

During operation of a basic service set (BSS), an AP may initiate a channel switch due to some reasons (for example, strong interference on an original channel or discovery of a radar satellite channel).

For example, the channel switch may include switching a link from a channel of one frequency band to a channel of another frequency band; or may include switching a link from a channel of one frequency band to another channel of the frequency band. For a multi-link device, channel switches of multiple stations included in the multi-link device are independent. For example, a channel switch may be performed on some stations of the multi-link device, and is not performed on other stations.

In a process of initiating a channel switch, the AP usually transmits a channel switch announcement element or an extended channel switch announcement element to a non-AP several DTIM beacon (DTIM Beacon) cycles in advance, to notify the non-AP of time and a target channel of the channel switch. The channel switch announcement element or extended channel switch announcement element may be carried in a beacon frame. When the time of the channel switch arrives, the AP and the associated non-AP switch to the target channel.

5. Operating Mode (OM) Control:

The IEEE 802.11ax standard defines an operation mode control subfield, which may be used by a transmitting station to change an operation parameter such as a channel bandwidth and a quantity of spatial streams of the transmitting station.

Generally, when the transmitting station is intended to change its operation parameter from a high capability parameter to a low capability parameter, the parameter changes after a transmission opportunity (TXOP) in which the transmitting station receives an acknowledgment frame ends. The acknowledgment frame is an acknowledgment frame corresponding to a frame carrying an operation mode control subfield. In other words, the transmitting station changes its parameter only after confirming that the acknowledgment frame corresponding to the operation mode control subfield is received.

When the transmitting station is intended to change its operation parameter from a low capability parameter to a high capability parameter, the parameter changes after a TXOP for transmitting an operation mode control subfield ends. In other words, after the transmitting station transmits the frame carrying the operation mode control subfield, even if the transmitting station does not correctly receive an acknowledgment frame of the frame, the transmitting station needs to change the parameter of the transmitting station after the TXOP for transmitting the operation mode control subfield ends. The reason that the transmitting station does not correctly receive the acknowledgment frame may be that the receiving station transmits the acknowledgment frame after receiving the frame carrying the operation mode control subfield, but the acknowledgment frame is not correctly received due to interference or another reason. In this case, because the receiving station may consider that the transmitting station has changed the parameter of the transmitting station to a high capability parameter, the receiving station may communicate with the transmitting station by using the high capability parameter. Because this case is considered, the parameter of the transmitting station needs to be changed after the TXOP for transmitting the operation mode control subfield ends regardless of whether the transmitting station correctly receives the acknowledgment frame.

For example, the foregoing parameter may be a bandwidth. The high capability parameter may refer to a large bandwidth, and the low capability parameter may refer to a small bandwidth. It may be understood that the large bandwidth and the small bandwidth herein correspond to bandwidths before and after the parameter changes.

As described in the background, currently, when initiating an association request to a station of an AP MLD, a station of a non-AP MLD reports, to the AP MLD, whether simultaneous transmitting and receiving on links can be performed. Reporting of an NSTR capability between links in another scenario is not discussed.

Based on this, this application provides an information transmitting and receiving method. The method may be used to exchange non-simultaneous transmitting and receiving capabilities between links after a non-AP MLD accesses a network, so that the non-AP MLD and an AP MLD have a consistent understanding of the non-simultaneous transmitting and receiving capabilities between the links, thereby improving communication efficiency.

The method provided in this application is applicable to a WLAN scenario, for example, is applicable to standards of an IEEE 802.11 system, for example, 802.11a/b/g, 802.11n, 802.11ac, 802.11ax, or a next generation of 802.11ax, for example, 802.11be or a further next generation standard. Alternatively, embodiments of this application are applicable to a wireless local area network system, for example, an Internet of things (IoT) network or a vehicle-to-X (V2X) system. It is clear that embodiments of this application are also applicable to another possible communication system, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, and a future 5th generation (5G) communication system.

The communication system applicable to this application is merely an example for description, and the communication system applicable to this application is not limited thereto. This is uniformly described herein, and details are not described below again.

Figures 4, 5, 6, 7:
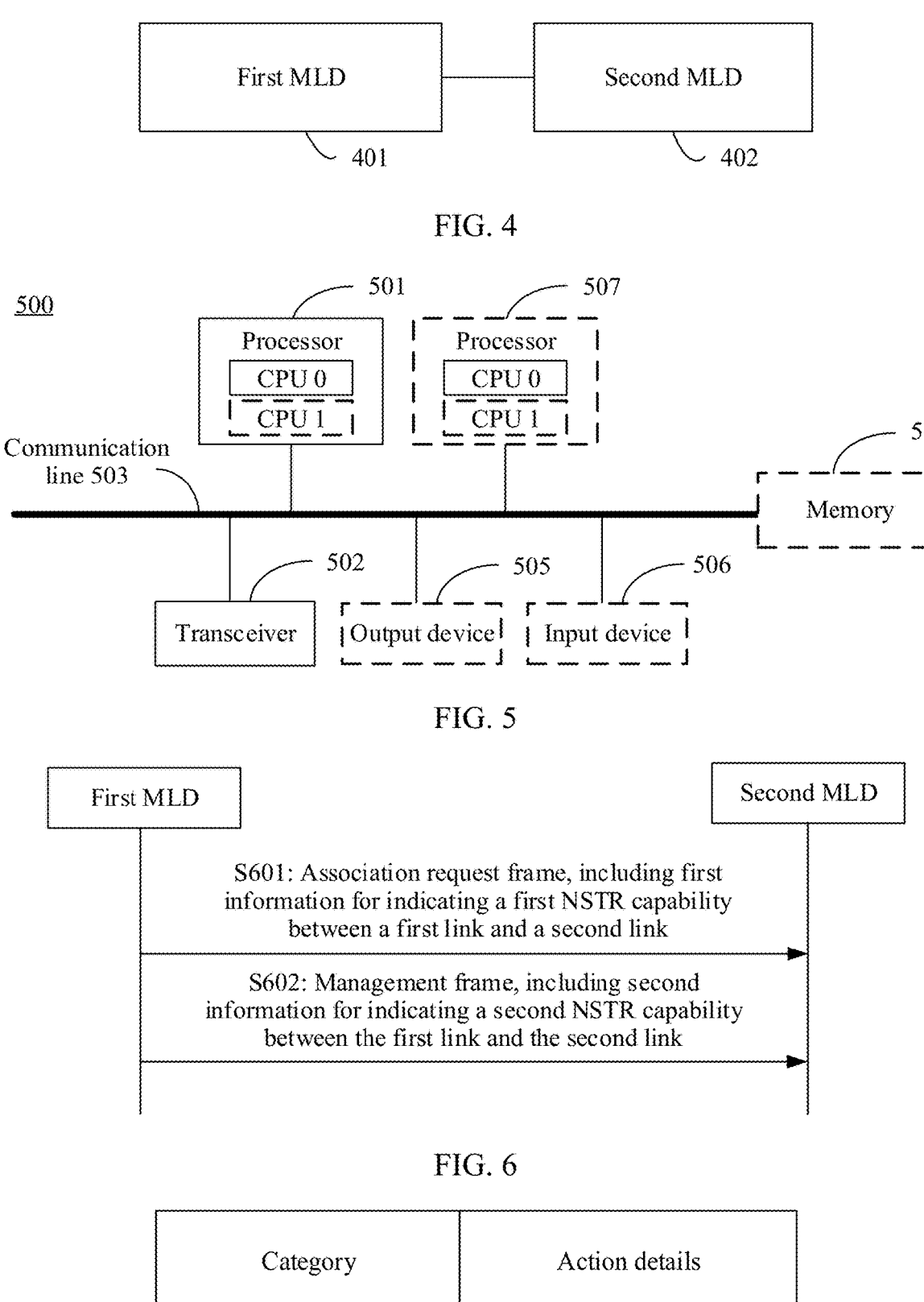
FIG. 4 is a schematic diagram of a structure of a communication system according to this application.
FIG. 5 is a schematic diagram of a structure of a WLAN device according to this application.
FIG. 6 is a schematic flowchart of a non-simultaneous transmitting and receiving capability indication method according to this application.
FIG. 7 is a schematic diagram of a structure of an action frame according to this application.

FIG. 4 is a WLAN communication system, provided in this application, to which an embodiment of this application is applicable. The WLAN communication system includes a first MLD 401 and a second MLD 402.

Multiple links are established between the first MLD 401 and the second MLD 402. In the following embodiments of this application, an example in which multiple links between the first MLD 401 and the second MLD 402 include a first link and a second link is used for description.

In some embodiments, in this application, the first MLD 401 is a non-AP MLD, and the second MLD 402 is an AP MLD. In this scenario, the first MLD may be a non-AP MLD associated with the second MLD.

In some embodiments, in this application, the first MLD 401 is a non-AP MLD, and the second MLD 402 is a non-AP MLD.

The non-AP MLD in this application may be a wireless communication chip, a wireless sensor, or a wireless communication terminal. Examples of the non-AP MLD may be a user terminal, a user apparatus, an access apparatus, a subscriber station, a subscriber unit, a mobile station, a user agent, and user equipment capable of Wi-Fi communication. The user terminal may be any one of various devices capable of wireless communication, such as a handheld device, a vehicle-mounted device, a wearable device, an Internet of Things (IoT) device, a computing device, another processing device connected to a wireless modem, and user equipment (UE) of various forms, a mobile station (MS), a terminal, terminal equipment, a portable communication device, a handheld device, a portable computing device, an entertainment device, a game device or system, a global positioning system device, any other suitable device configured for network communication via a wireless medium, and the like. In addition, the non-AP MLD may support the 802.11be standard or a next-generation WLAN standard of the 802.11be standard. The non-AP MLD may also support multiple WLAN standards such as 802.11ax, 802.11ac, 802.11n, 802.11g, 802.11b, and 802.11a.

The AP MLD in embodiments of this application may be an apparatus that is deployed in a wireless communication network to provide a wireless communication function for a non-AP associated with the AP MLD. The AP MLD is mainly deployed at home, inside a building, and in a campus, with a typical coverage radius of tens of meters to hundreds of meters. Certainly, the AP MLD may alternatively be deployed outdoors. The AP MLD is equivalent to a bridge that connects the wired network and the wireless network. A main function of the AP MLD is to connect various wireless network clients together and then connect the wireless network to the Ethernet. In some embodiments, the AP MLD may be a communication device with a Wi-Fi chip, for example, a base station, a router, a gateway, a repeater, a communication server, a switch, or a bridge. The base station may include a macro base station, a micro base station, a relay station, and the like in various forms. In addition, the AP MLD may support the 802.11be standard or a next-generation WLAN standard of the 802.11be standard. The AP MLD may also support WLAN standards such as 802.11ax, 802.11ac, 802.11n, 802.11g, 802.11b, and 802.11a.

In some embodiments, the AP MLD and the non-AP MLD in this application may be collectively referred to as a WLAN device. During implementation, the WLAN device may use a composition structure shown in FIG. 5, or include components shown in FIG. 5.

FIG. 5 is a schematic composition diagram of a WLAN device 500 according to this application. The WLAN device 500 may be a non-AP MLD or a chip or a chip system (or referred to as a system on a chip) in the non-AP MLD, or may be an AP MLD or a chip or a chip system (or referred to as a system on a chip) in the AP MLD. In embodiments of this application, the chip system may include a chip, or may include a chip and another discrete component.

As shown in FIG. 5, the WLAN device 500 includes a processor 501 and a transceiver 502. Further, the WLAN device 500 may further include a memory 504. The processor 501, the memory 504, and the transceiver 502 may be connected through the communication line 503.

The processor 501 is a central processing unit (CPU), a general-purpose processor, a network processor (NP), a digital signal processor (DSP), a microprocessor, a microcontroller, a programmable logic device (PLD), or any combination thereof. Alternatively, the processor 501 may be another apparatus having a processing function, for example, a circuit, a component, or a software module. This is not limited.

The transceiver 502 is configured to communicate with another device or another communication network. The another communication network may be an Ethernet, a radio access network (RAN), a WLAN, or the like. The transceiver 502 may be a module, a circuit, a transceiver, or any apparatus that can implement communication.

The communication line 503 is configured to transmit information between components included in the WLAN device 500.

The memory 504 is configured to store a computer program or instructions.

The memory 504 may be a read-only memory (ROM) or another type of static storage device that can store static information and/or instructions; may be a random access memory (RAM) or another type of dynamic storage device that can store information and/or instructions; or may be an electrically erasable programmable read-only memory (EEPROM), a compact disc read-only memory (CD-ROM) or another compact disc storage, an optical disc storage (including a compressed optical disc, a laser disc, an optical disc, a digital universal optical disc, a Blu-ray disc, or the like), a magnetic disk storage medium or another magnetic storage device, or the like. This is not limited.

It should be noted that the memory 504 may be independent of the processor 501, or may be integrated with the processor 501. The memory 504 may be configured to store instructions, program code, some data, or the like. The memory 504 may be located in the WLAN device 500, or may be located outside the WLAN device 500. This is not limited. The processor 501 is configured to execute the instructions stored in the memory 504, to implement the method provided in the following embodiments of this application.

In an example, the processor 501 may include one or more CPUs, for example, a CPU 0 and a CPU 1 in FIG. 5.

In some embodiments, the WLAN device 500 includes multiple processors. For example, in addition to the processor 501 in FIG. 5, the WLAN device 500 may further include a processor 507.

In some embodiments, the WLAN device 500 further includes an output device 505 and an input device 506. For example, the input device 506 is a device such as a keyboard, a mouse, a microphone, or a joystick, and the output device 505 is a device such as a display screen or a speaker.

It may be understood that the composition structure shown in FIG. 5 does not constitute a limitation on the WLAN device. In addition to the components shown in FIG. 5, the WLAN device may include more or fewer components than those shown in the figure, or combine some components, or have a different component arrangement.

The foregoing describes the communication system and the WLAN device provided in this application. The following describes the technical solutions in embodiments of this application with reference to the accompanying drawings in embodiments of this application.

It should be noted that, in the following embodiments of this application, names of messages between apparatuses, names of parameters, names of information, or the like are merely an example, and may be other names in another embodiment. This is not limited in the method provided in this application.

It may be understood that, in embodiments of this application, the first MLD and/or the second MLD may perform a part of or all operations in embodiments of this application. These operations are merely examples. In embodiments of this application, other operations or variations of various operations may be further performed. In addition, the operations may be performed in a sequence different from a sequence presented in embodiments of this application, and not all operations in embodiments of this application need to be performed.

FIG. 6 is a schematic flowchart of an information transmitting and receiving method according to an embodiment of this application. In the following, an example in which the method provided in this embodiment of this application is applied to the application scenario shown in FIG. 4 is used, and the link between the first MLD and the second MLD includes the first link and the second link. Certainly, embodiments of this application may also be applied to another possible communication scenario or communication system. For example, in a scenario of reporting an NSTR capability between links, reporting may be performed by using the method provided in embodiments of this application.

It should be noted that, in the following embodiments of this application, interaction between the first MLD and the second MLD may actually be interaction between a station affiliated with the first MLD and a station affiliated with the second MLD. The station may be a station corresponding to any enabled link between the first MLD and the second MLD. For example, interaction between the first MLD and the second MLD may be interaction between a station corresponding to the first link in the first MLD and a station corresponding to the first link in the second MLD. For ease of description, in the following embodiments of this application, interaction between the first MLD and the second MLD is used as a manner of description. Actually, interaction may alternatively be interaction between a station affiliated with the first MLD and a station affiliated with the second MLD.

In some embodiments, as shown in FIG. 6, the information transmitting and receiving method provided in this application includes the following operations.

S601: A first MLD transmits an association request frame to a second MLD. Correspondingly, the second MLD receives the association request frame from the first MLD.

The association request frame includes first information, and the first information indicates a first NSTR capability between a first link and a second link.

For example, if the first MLD is a non-AP MLD, and the second MLD is an AP MLD, the first NSTR capability is an NSTR capability between the first link and the second link in an association process.

In some embodiments, the association request frame may include a basic variant multi-link element, and the first information may be carried in an NSTR indication bitmap field in the basic variant multi-link element. For a frame structure of a basic variant multi-link element, refer to FIG. 3 and descriptions corresponding to FIG. 3. Details are not described herein again.

S602: The first MLD transmits a management frame to the second MLD. Correspondingly, the second MLD receives the management frame from the first MLD.

The management frame includes second information, and the second information indicates a second NSTR capability between the first link and the second link.

In some embodiments, the second NSTR capability is used to replace or update the first NSTR capability. In other words, the second NSTR capability may be a latest NSTR capability between the first link and the second link.

In some embodiments, when the first MLD is a non-AP MLD, and the second MLD is an AP MLD, the non-AP MLD may transmit the management frame after the non-AP MLD is associated with the AP MLD. The second NSTR capability may be a latest NSTR capability between the first link and the second link after association.

In some embodiments, the NSTR capability may be used to indicate whether NSTR is between two links. In other words, the NSTR capability may be used to indicate whether the two links can perform simultaneous transmitting and receiving. For example, the NSTR capability may be true, and indicates that NSTR is between two links, that is, simultaneous transmitting and receiving on the two links cannot be performed; or the NSTR capability may be false, and indicates that STR is between two links, that is, simultaneous transmitting and receiving on the two links can be performed.

In an example, that simultaneous transmitting and receiving on the two links cannot be performed may include: when a signal is received on one link, a signal cannot be transmitted on the other link; or receiving a signal on one link blocks transmitting a signal on the other link at the same time. That simultaneous transmitting and receiving on the two links can be performed may include: when a signal is received on one link, a signal can be transmitted on the other link; or receiving a signal on one link does not block transmitting a signal on the other link at the same time.

In some embodiments, solutions of this application may be appropriately changed. For example, the NSTR capability is changed to an STR capability, and the STR capability may indicate whether STR is between two links. In other words, the STR capability may indicate whether the two links can perform simultaneous transmitting and receiving. Therefore, the STR capability and the NSTR capability have the same function, but interpretation for the STR capability and interpretation for the NSTR capability are opposite. For example, when the NSTR capability is true, the STR capability is false; or when the NSTR capability may be false, the STR capability is true.

In addition, the NSTR capability in this application may also be denoted as an NSTR/STR capability, or referred to as an NSTR capability status, and may be used interchangeably. This is not limited in this application.

In some embodiments, a link pair formed by the first link and the second link may be referred to as a first link pair. Therefore, the NSTR capability between the first link and the second link may also be referred to as the NSTR capability of the first link pair.

In some embodiments, that the first information indicates a first NSTR capability between a first link and a second link may also be understood as follows: The first information indicates a first transmitting and receiving relationship between the first link and the second link, and the first transmitting and receiving relationship includes NSTR and STR. When the first transmitting and receiving relationship is NSTR, it may be considered that the first NSTR capability is true; or when the first transmitting and receiving relationship is STR, it may be considered that the first NSTR capability is false.

In some embodiments, that the second information indicates a second NSTR capability between the first link and the second link may also be understood as follows: The second information indicates a second transmitting and receiving relationship between the first link and the second link, and the second transmitting and receiving relationship includes NSTR and STR. When the second transmitting and receiving relationship is NSTR, it may be considered that the second NSTR capability is true; or when the second transmitting and receiving relationship is STR, it may be considered that the second NSTR capability is false.

It can be understood that, the first MLD may generate the association request frame before the first MLD transmits the association request frame. Similarly, before the first MLD transmits the management frame, the management frame may be generated.

In some embodiments, the management frame may be an action frame. FIG. 7 is a common frame structure of an action frame, and the action frame includes a category field and an action details field. The category field indicates a type of an action frame. For example, the action frame in this application may be an EHT action frame. The action details field usually includes an action field that indicates a format (or a function) of an action frame indicated by the category field. An EHT action frame is used as an example. The action field may indicate a format (or a function) of the EHT action frame. For example, when the action field is set to 0, it indicates that the EHT action frame is used for compressed beamforming (EHT compressed beamforming).

In some other embodiments, the management frame may be a new type of management frame. For ease of description, the new type of management frame is referred to as a first management frame in this application. A type of the first management frame may be indicated by using an element identifier (Element ID) field and/or an element identifier extension (Element ID Extension) field. For example, the type of the first management frame is indicated by using a reserved element identifier value; or when the element identifier is equal to 255, the type of the first management frame is indicated by using a reserved element identifier extension value.

In this application, the management frame including the second information may be referred to as an NSTR capability update frame. Certainly, the management frame may have another name, for example, an NSTR capability report frame. A name of the management frame is not limited in this application.

In some embodiments, after receiving the management frame, the second MLD may use the management frame. For example, the NSTR capability between the first link and the second link is determined based on the second information included in the management frame, so as to communicate with the first MLD in a manner matching the NSTR capability. Certainly, after receiving the management frame, the second MLD may further perform another operation. This is not limited in this application.

The foregoing uses an example in which links between the first MLD and the second MLD include the first link and the second link, to describe NSTR capability indication between the first link and the second link. In some embodiments, in addition to the first link and the second link, the links between the first MLD and the second MLD may further include another link. In other words, in addition to the first link pair formed by the first link and the second link, another link pair may be further included.

In some embodiments, in addition to the NSTR capability of the first link pair, the first MLD further reports an NSTR capability of another link pair in the management frame, regardless of whether the NSTR capability of the another link pair changes.

For example, the link between the first MLD and the second MLD further includes a third link. A link pair formed by the first link and the third link is a second link pair, and a link pair formed by the second link and the third link is a third link pair. If the NSTR capability of the first link pair changes, an NSTR capability of the second link pair changes, and an NSTR capability of the third link pair does not change, the management frame may indicate the NSTR capability of the first link pair, the NSTR capability of the second link pair, and the NSTR capability of the third link pair.

In some embodiments, the first MLD reports, in the management frame, NSTR capabilities of link pairs whose NSTR capabilities change. After receiving the management frame, the second MLD updates the NSTR capabilities of this part of link pairs. For an NSTR capability of a link pair that is not reported in the management frame, the second MLD considers by default that the NSTR capability is not changed.

For example, the link between the first MLD and the second MLD further includes a third link. A link pair formed by the first link and the third link is a second link pair, and a link pair formed by the second link and the third link is a third link pair. If the NSTR capability of the first link pair changes, an NSTR capability of the second link pair changes, and an NSTR capability of the third link pair does not change, the management frame may indicate the NSTR capability of the first link pair and the NSTR capability of the second link pair.

In addition, in some embodiments, there may be a delay in switching of an NSTR capability of a link pair. For these scenarios, if the NSTR capability of the link pair changes from STR to NSTR, a management frame may be first transmitted to report a changed NSTR capability, and then capability switching is performed. If the NSTR capability of the link pair changes from the NSTR to the STR, capability switching may be performed first, and then a management frame is transmitted to report a changed NSTR capability.

In an example, if NSTR capabilities of multiple link pairs change, for example, an NSTR capability of a type-1 link pair changes from STR to NSTR, and an NSTR capability of a type-2 link pair changes from NSTR to STR, the NSTR capability of the type-1 link pair may be reported in one management frame, and the NSTR capability of the type-2 link pair may be reported in another management frame.

Based on this solution, the first MLD may report the first NSTR capability and the second NSTR capability that are between the first link and the second link to the second MLD. In some embodiments, the first MLD may report the NSTR capability between the first link and the second link to the second MLD for multiple times, so that the first MLD may notify the second MLD in time when the NSTR capability between the first link and the second link changes. In this way, the first MLD and the second MLD can have a consistent understanding of the NSTR capability between the links, thereby improving communication efficiency.

The following describes a manner of carrying the second information in the management frame.

In some embodiments, the management frame may include a first bitmap, bits in the first bitmap are in a one-to-one correspondence with link pairs, and each bit indicates an NSTR capability of one link pair. In this manner, the second information may be indicated by using one bit in the first bitmap.

Alternatively, the management frame may include multiple second bitmaps, and the multiple second bitmaps are in a one-to-one correspondence with multiple links of the first MLD. Each bit in the second bitmap indicates an NSTR capability between a link corresponding to the second bitmap and another link. It should be understood that a bit sequence of the second bitmap has a mapping relationship with a sequence of another link. For example, bits from a high-order bit to a low-order bit in the second bitmap sequentially correspond to links with link identifiers in descending order; or bits from a high-order bit to a low-order bit in the second bitmap sequentially correspond to links with link identifiers in ascending order. In this manner, the second information may be indicated by using one bit in the second bitmap corresponding to the first link.

For example, multiple links of the first MLD include the first link, the second link, the third link, and a fourth link. The management frame may include a second bitmap A, a second bitmap B, a second bitmap C, and a second bitmap D, which respectively correspond to the first link, the second link, the third link, and the fourth link. The second bitmap A may include four bits that respectively correspond to an NSTR capability between the first link and the first link, an NSTR capability between the first link and the second link, an NSTR capability between the first link and the third link, and an NSTR capability between the first link and the fourth link. The bit indicating the NSTR capability between the first link and the first link is meaningless, and may be used as a reserved bit. Similarly, the second bitmap B may also include four bits that respectively correspond to the NSTR capability between the second link and the first link, an NSTR capability between the second link and the second link, an NSTR capability between the second link and the third link, and an NSTR capability between the second link and the fourth link. The bit indicating the NSTR capability between the second link and the second link is meaningless, and may be used as a reserved bit. The second bitmap C may also include four bits that respectively correspond to the NSTR capability between the third link and the first link, the NSTR capability between the third link and the second link, an NSTR capability between the third link and the third link, and an NSTR capability between the third link and the fourth link. A bit indicating the NSTR capability between the third link and the third link is meaningless, and may be used as a reserved bit. The second bitmap D may also include four bits that respectively correspond to the NSTR capability between the fourth link and the first link, the NSTR capability between the fourth link and the second link, the NSTR capability between the fourth link and the third link, and an NSTR capability between the fourth link and the fourth link. The bit indicating the NSTR capability between the fourth link and the fourth link is meaningless, and may be used as a reserved bit.

In some other embodiments, the management frame may include a multi-link element, and the second information may be carried in the multi-link element. The multi-link element may be implemented in the following two manners.

Manner 1: The multi-link element may be a basic variant multi-link element.

In some embodiments, a frame structure of the basic variant multi-link element may be shown in FIG. 3. The basic variant multi-link element includes a multi-link control field and a link information field.

When the basic variant multi-link element carries the second information, the second information may be carried in an NSTR indication bitmap field in the link information field. Further, the second information may be carried in the NSTR indication bitmap field in a per-STA profile field that corresponds to the first link and that is included in the link information field.

When the basic variant multi-link element carries the second information, a first field may be set to 0. The first field may include at least one of the following: a multi-link device media access control address present field, a link identifier information present field, a change sequence present field, a multi-link device capability present field, or an EMLSR capability present field included in the multi-link control field. When the first field is set to 0, it may indicate that a common information field in the basic variant multi-link element does not include at least one of the following: a multi-link device media access control address field, a link identifier information field, a change sequence field, a multi-link device capability field, or an EMLSR capability field.

It may be understood that a present field included in the first field corresponds to a field that is not included in the common information field. For example, if the first field includes the link identifier information present field, the common information field does not include the link identifier information field.

When the basic variant multi-link element carries the second information, a second field included in the link information field may be set to 0. The second field may include at least one of the following: a complete profile field, a media access control address present field, a beacon interval present field, or a DTIM information present field. When the second field is set to 0, it may indicate that the basic variant multi-link element does not include complete information of the first link, or a station information field in the link information field does not include a station media access control address field, a beacon interval field, a DTIM quantity field, or a DTIM period field.

It may be understood that a present field included in the second field corresponds to a field that is not included in the station information field. For example, if the second field includes the beacon interval present field, the station information field does not include the beacon interval field.

Further, when the basic variant multi-link element carries the second information, the basic variant multi-link element may not include a station profile field.

The complete profile field, the media access control address present field, the beacon interval present field, and the DTIM information present field may be collectively referred to as second fields. The second field may be carried in a per-STA profile field that is in the link information field and that corresponds to the first link.

Figure 8:
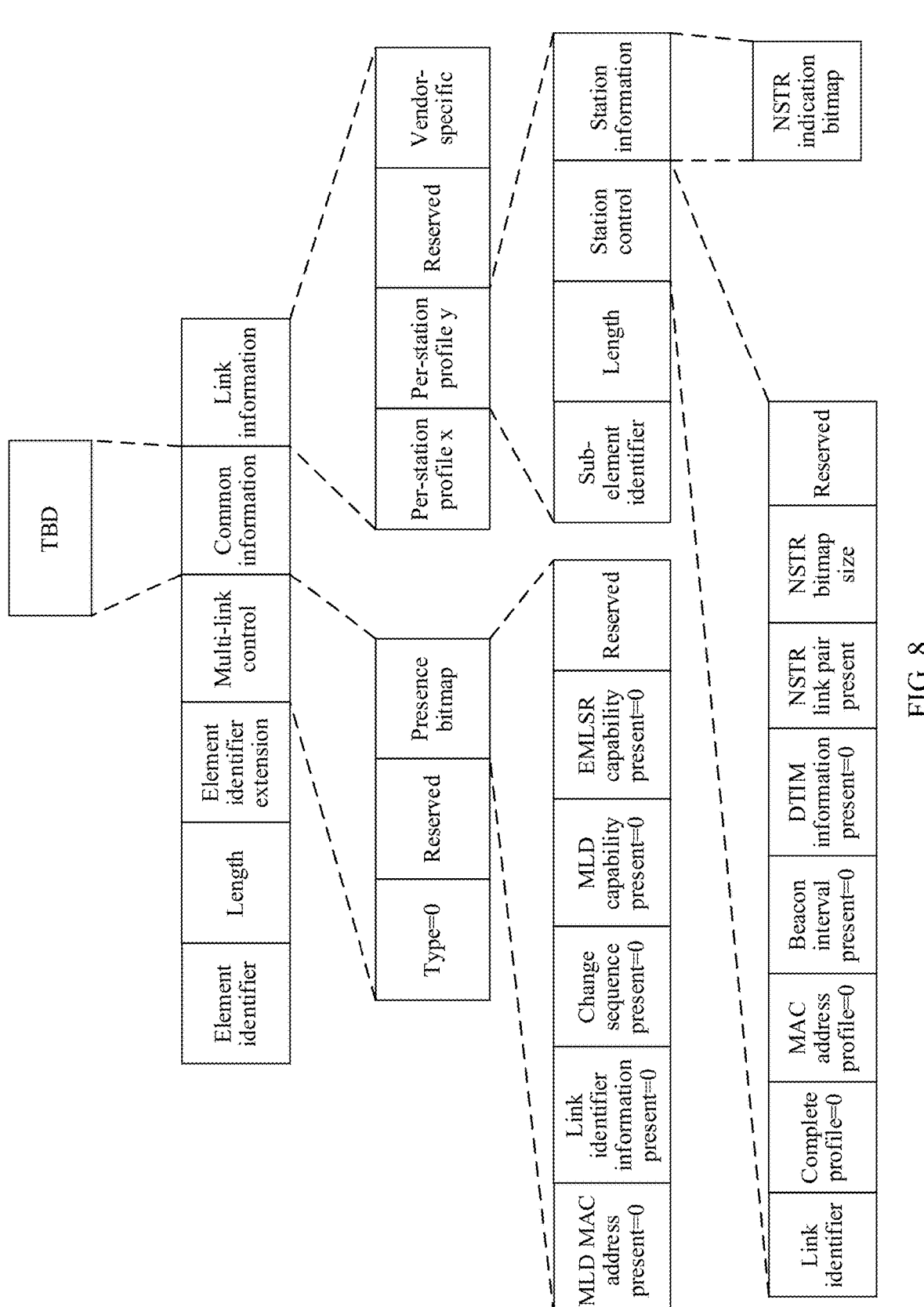
FIG. 8 is a schematic diagram of a frame structure of a multi-link element according to this application.

In conclusion, when the basic variant multi-link element carries the second information, in an embodiment, a frame structure of the basic variant multi-link element and settings of some fields may be shown in FIG. 8.

It should be noted that the basic variant multi-link element in the manner 1 may be based on a basic variant multi-link element in the current 802.11be standard. In a subsequent standard development process, if a frame structure of a basic variant multi-link element in the current 802.11be standard changes, the manner 1 may also be appropriately changed to be applicable to NSTR capability reporting in an evolved standard. For example, if a present field is newly added to a basic variant multi-link element in a subsequent standard, when the solution of this application is used, the newly added present field may be set to 0, to indicate that a field corresponding to the present field is not present.

Manner 2: The multi-link element may be an update variant multi-link element.

In some embodiments, the update variant multi-link element may include a multi-link control field and a link information field.

In an example, the multi-link control field may include a type field, the type field may be set to a first value, and the first value may be a type value that is not used by a basic variant multi-link element. For example, the first value is 2. Further, the multi-link control field does not include a first field. For the first field, refer to the description in the manner 1. Details are not described herein again.

In an example, the link information field may include an NSTR indication bitmap field, and the second information may be carried in the NSTR indication bitmap field. In an embodiment, one bit in an NSTR bitmap may correspond to one link pair, and a value of the bit may indicate an NSTR capability of the link pair corresponding to the bit. For example, the NSTR bitmap includes a bit corresponding to the first link pair formed by the first link and the second link, and a value of the bit may indicate the NSTR capability of the first link pair, that is, the bit may indicate the second information. In addition, the link information field does not include the second field. For the second field, refer to the description in the foregoing manner 2. Details are not described herein again.

In some embodiments, the link information field may include per-STA profile sub-elements, and the per-STA profile sub-elements are in a one-to-one correspondence with links of the first MLD. The per-STA profile field may include a sub-element identifier (Subelement ID) field, a length field, a station control (STA Control) field, and a station information (STA Info) field. For functions of the sub-element identifier field and the length identifier field, refer to descriptions of corresponding fields in the frame structure shown in FIG. 3. Details are not described herein again. The station information field may include the foregoing NSTR indication bitmap field.

In some embodiments, the station control field may include an NSTR link pair present field and an NSTR bitmap size field. The NSTR link pair present field indicates whether the link information field includes the NSTR indication bitmap field. The NSTR bitmap size field indicates a size of the NSTR indication bitmap field when the link information field includes the NSTR indication bitmap field.

In an embodiment, the NSTR link pair present field indicates whether a station information field in the link information field includes the NSTR indication bitmap field. The NSTR bitmap size field indicates a size of the NSTR indication bitmap field when the station information field in the link information field includes the NSTR indication bitmap field. It may be understood that this application is described by using an example in which the link information field includes the NSTR indication bitmap field.

Further, the station control field may further include a link identifier field for identifying a link (for example, a first link) corresponding to the per-STA profile sub-element including the station control field. In addition, the station control field may further include a reserved field.

In some embodiments, in addition to the multi-link control field and the link information field, the update variant multi-link element may further include at least one of the following: an element identifier (element ID) field, a length field, or an element identifier extension (Element ID Extension) field. The element identifier field and the element identifier extension field are used to identify the update variant multi-link element, and the length field indicates a length of the update variant multi-link element.

Figure 9:
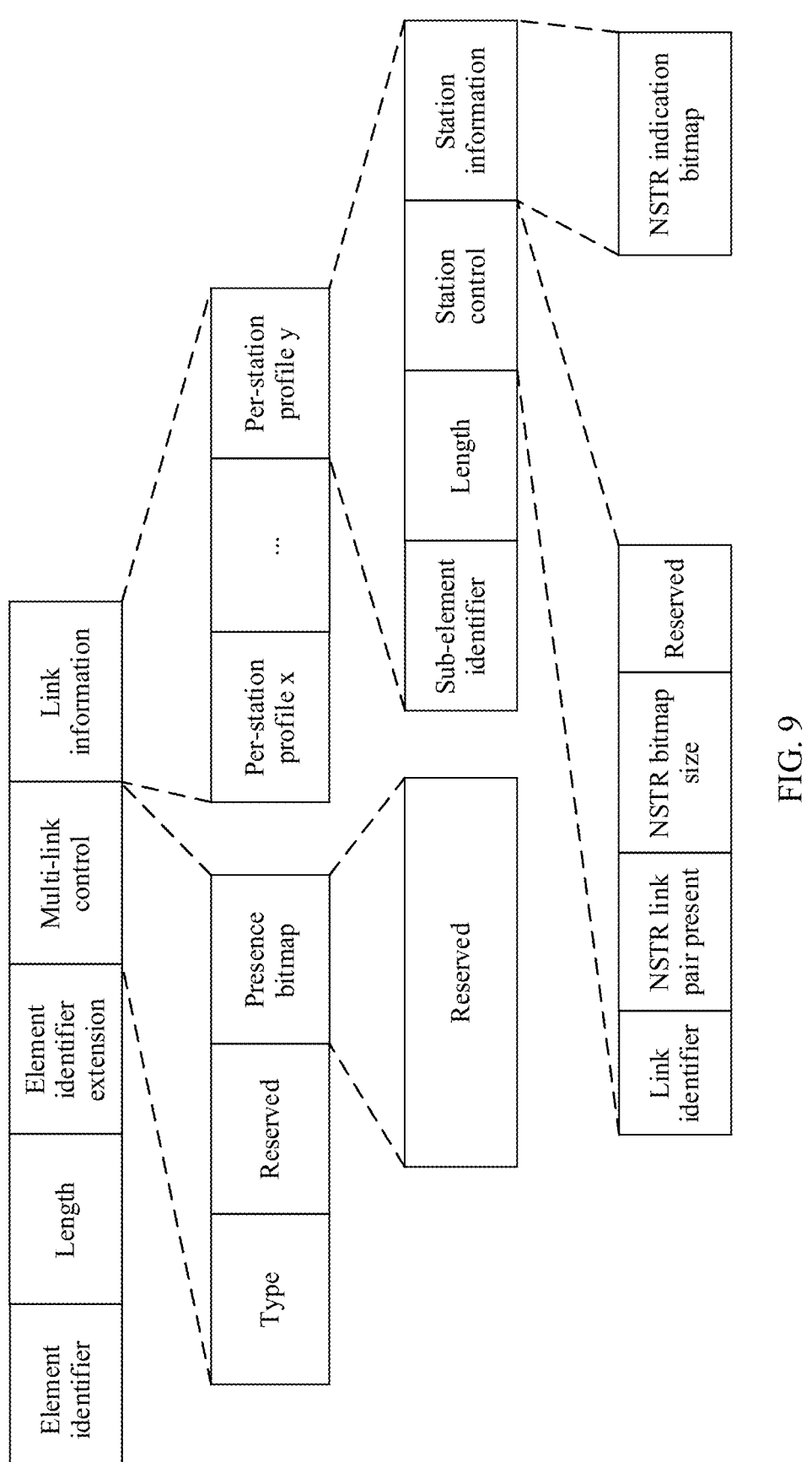
FIG. 9 is a schematic diagram of a frame structure of a multi-link element according to this application.

In conclusion, a possible frame structure of the update variant multi-link element provided in the manner 2 may be shown in FIG. 9.

It should be noted that the update variant multi-link element in this application may also have another name, for example, an updated variant multi-link element. A name of the update variant multi-link element is not limited in this application. In addition, in this application, each field or sub-element in the update variant multi-link element may have another name. This is not limited in this application.

In some embodiments, in addition to the multi-link element, the management frame may further include a third field. When a value of the third field is a second value, it may indicate that the management frame is used for update of the NSTR capability between the first link and the second link.

In an example, when the management frame is an action frame, the third field may be an action field in an action details field in the action frame, and the second value may be, for example, 1. Certainly, the third field may alternatively be another field in the action frame. This is not limited in this application.

Based on this solution, a function of the management frame can be indicated to the second MLD, so that the second MLD can correctly interpret the management frame, to obtain the second NSTR capability between the first link and the second link.

The foregoing description describes an overall process of reporting the NSTR capability. Further, after a channel switch, a frequency spacing between two links may change. The frequency spacing is an important factor that affects the NSTR capability between the links. Therefore, NSTR capability interaction in a channel switch scenario is further considered in this application. The following further describes the procedure shown in FIG. 6 by using an example in which the first MLD is a non-AP MLD and the second MLD is an AP MLD.

For the first MLD, this application mainly provides conditions for transmitting a management frame. For example, in a channel switch scenario, the first MLD may transmit the management frame in the following two cases.

Case 1: When a channel switch occurs, the first MLD transmits the management frame to the second MLD.

In an embodiment, in the case 1, the second NSTR capability indicated by the second information included in the management frame is an NSTR capability between the first link and the second link after the channel switch.

In this case, NSTR capability reporting is triggered by the channel switch. In other words, after the channel switch occurs, regardless of whether the NSTR capability between the first link and the second link changes, the first MLD may report the NSTR capability after the channel switch.

Case 2: When a channel switch occurs and a first condition is not satisfied, the first MLD transmits the management frame to the second MLD.

In an embodiment, in the case 2, the second NSTR capability indicated by the second information included in the management frame is an NSTR capability between the first link and the second link after the channel switch.

In some embodiments, the first condition includes at least one of the following:

(1) After the channel switch, one of a frequency band accessed by the first link and a frequency band accessed by the second link is in a first frequency band, and the other is in a second frequency band.

In an example, the first frequency band and the second frequency band may be specified in a protocol. For example, the first frequency band is a 2.4 GHz frequency band, and the other is a 5 GHz frequency band or a 6 GHz frequency band. In other words, after the channel switch, one of the frequency band accessed by the first link and the frequency band accessed by the second link is in the 2.4 GHz frequency band, and the other is in the 5 GHz frequency band or the 6 GHz frequency band.

In some embodiments, in subsequent standard development, if a new Wi-Fi frequency band is allocated, the first frequency band and the second frequency band may also change. For example, if a 7 GHz Wi-Fi frequency band is subsequently allocated, the condition (1) may be: one of the frequency band accessed by the first link and the frequency band accessed by the second link is in the 2.4 GHz frequency band, and the other is in the 5 GHz, 6 GHz, or 7 GHz frequency band. Alternatively, the condition (1) may be: one of the frequency band accessed by the first link and the frequency band accessed by the second link is in the 5 GHz frequency band, and the other is in the 7 GHz frequency band.

In some embodiments, when one of the frequency band accessed by the first link and the frequency band accessed by the second link is in the first frequency band and the other is in the second frequency band, STR is between the first link and the second link.

(2) After the channel switch, a frequency spacing between the first link and the second link is greater than or equal to a first threshold.

In an embodiment, the frequency spacing between the first link and the second link may be a difference between nearest frequency edges of the first link and the second link (the difference between the nearest frequency edges of two links), or may be a spacing between center frequencies of the first link and the second link.

For example, a channel bandwidth of the first link is A, a channel bandwidth of the second link is B, a center frequency of the first link is A0, a center frequency of the second link is B0, and A0 is lower than B0. Nearest frequency edges of the first link and the second link are BL and AH. BL=B0−B/2; AH=A0+A/2.

In some embodiments, the first threshold may be determined by the first MLD. For example, the first threshold may be a threshold reported by the non-AP MLD to the AP MLD in an association process. For example, the non-AP MLD may report a parameter of frequency separation for STR, and the parameter indicates the first threshold.

In some embodiments, the first threshold may be predefined in a protocol, or may be configured by the second MLD for the first MLD. This is not limited in this application.

In some embodiments, when the frequency spacing between the center frequencies of the first frequency band and the second frequency band is greater than or equal to a second threshold, STR is between the first link and the second link.

(3) Before the channel switch, STR is between the first link and the second link, and after the channel switch, a frequency spacing between the first link and the second link remains unchanged or becomes larger.

In an embodiment, for a frequency spacing between the first link and the second link, refer to related descriptions in (2). Details are not described herein again.

In some embodiments, before the channel switch, STR is between the first link and the second link. After the channel switch, if a frequency spacing between the first link and the second link remains unchanged or becomes larger, STR is still between the first link and the second link.

In an embodiment, that a frequency spacing between the first link and the second link remains unchanged or becomes larger after the channel switch may include: After the channel switch, the frequency spacing between the first link and the second link remains unchanged or becomes larger, and a relative relationship of frequencies of the first link and the second link remains unchanged.

For example, the relative relationship of the frequencies of the first link and the frequency of the second link may refer to a relationship between the center frequency of the first link and the center frequency of the second link. That a relative relationship of frequencies of the first link and the second link remains unchanged may include: Before the channel switch, the center frequency of the first link is greater than the center frequency of the second link, and after the channel switch, the center frequency of the first link is still greater than the center frequency of the second link; or before the channel switch, the center frequency of the first link is less than the center frequency of the second link, and after the channel switch, the center frequency of the first link is still less than the center frequency of the second link.

(4) Before the channel switch, NSTR is between the first link and the second link, and after the channel switch, a frequency spacing between the first link and the second link remains unchanged or becomes smaller.

In an embodiment, for a frequency spacing between the first link and the second link, refer to related descriptions in (2). Details are not described herein again.

In some embodiments, before the channel switch, NSTR is between the first link and the second link. After the channel switch, if a frequency spacing between the first link and the second link remains unchanged or becomes larger, NSTR is still between the first link and the second link.

In an embodiment, that a frequency spacing between the first link and the second link remains unchanged or becomes smaller after the channel switch may include: After the channel switch, the frequency spacing between the first link and the second link remains unchanged or becomes smaller, and a relative relationship of frequencies of the first link and the second link remains unchanged. For the relative relationship of frequencies of the first link and the second link, refer to the description in the foregoing condition (3). Details are not described herein again.

It may be understood that a change of the frequency spacing between the first link and the second link in (3) and (4) is a comparison relative to the frequency spacing between the first link and the second link before the channel switch. For example, increase of the frequency spacing between the two links after the channel switch is relative to the frequency spacing between the two links before the channel switch.

The first condition in the foregoing example is related to frequencies of links. In a process of a channel switch, the AP MLD can learn of a target channel after the switch, so that determining of the first condition can also be performed by the AP MLD side. Therefore, when the first condition is met, the AP MLD can learn of the NSTR capability between the first link and the second link after the channel switch. In this scenario, the non-AP MLD may not transmit the management frame.

When the first condition is not met, the AP MLD may not be able to determine the NSTR capability between the first link and the second link after the channel switch. In this scenario, the non-AP MLD may transmit the management frame to the AP, to report the NSTR capability between the first link and the second link after the channel switch.

In an embodiment, the AP MLD cannot determine the NSTR capability between the first link and the second link after the channel switch, and a reason why the non-AP MLD can determine the NSTR capability between the first link and the second link after the channel switch may be that the non-AP MLD learns of more link information than the AP MLD.

Case 3: After a channel switch announcement is received and before the channel switch is performed, the first MLD transmits a management frame to the second MLD.

In an embodiment, in the case 3, the second NSTR capability indicated by the second information included in the management frame is an NSTR capability between the first link and the second link after the channel switch.

The channel switch announcement indicates channel switch time and a target channel. For example, the channel switch announcement may be carried in a channel switch announcement element or an extended channel switch announcement element.

In some embodiments, the second MLD may transmit the channel switch announcement to the first MLD several DTIM beacons in advance, so that the first MLD may determine, before the channel switch, the NSTR capability between the first link and the second link that is after the channel switch, and transmit a management frame to the second MLD before the channel switch is performed, to indicate the NSTR capability between the first link and the second link after the channel switch.

Because the management frame is transmitted before the channel switch, for the second MLD, whether the second NSTR capability indicated by the action is an NSTR capability before the channel switch or the NSTR capability after the channel switch may not be distinguished.

Therefore, in some embodiments, the second MLD may use, as the NSTR capability after the channel switch, the NSTR capability indicated by the management frame received after the channel switch announcement is transmitted.

In some embodiments, the management frame may further include third information, and the third information indicates that the second NSTR capability is the NSTR capability between the first link and the second link after the channel switch. For example, the third information may be carried in the multi-link element. For example, 1 bit is added to the multi-link element for indication, and a value of the bit indicates that the NSTR capability is the NSTR capability before the channel switch or the NSTR capability after the channel switch. For example, when the bit is set to 0, it indicates that the NSTR capability indicated by the multi-link element is the NSTR capability before the channel switch; when the bit is set to 1, it indicates that the NSTR capability indicated by the multi-link element is the NSTR capability after the channel switch. In an embodiment, the 1-bit indication may be carried in a station control field in the per-STA profile field.

If the first MLD reports the NSTR capability after the channel switch, the first MLD may need to perform channel contention before transmitting the management frame. Therefore, a delay exists in transmitting of and receiving of the management frame. Therefore, for the second MLD, this application mainly provides a manner in which the second MLD determines the NSTR capability between the first link and the second link in a first time interval. The first time interval is a time interval from a time point at which channel switch occurs to a time point at which the second MLD receives the management frame. For example, the second MLD may determine the NSTR capability between the first link and the second link within the time interval in at least one of the following three manners:

Manner 1: The second MLD determines that NSTR is between the first link and the second link in the first time interval.

In this manner 1, the second MLD may simply consider that NSTR is between the first link and the second link, to reduce implementation complexity of the second MLD. In addition, the second MLD determines that NSTR is between the first link and the second link. Even if STR is actually between the first link and the second link in the first time interval, the second MLD communicates with the first MLD by using a parameter corresponding to NSTR. In this case, there is no great transmission error.

Manner 2: When a second condition is met, the second MLD determines that STR is between the first link and the second link in the first time interval.

In some embodiments, the second condition includes at least one of the following:

(1) After the channel switch, one of a frequency band accessed by the first link and a frequency band accessed by the second link is in a first frequency band, and the other is in a second frequency band.

For example, after the channel switch, one of the frequency band accessed by the first link and the frequency band accessed by the second link is in the 2.4 GHz frequency band, and the other is in the 5 GHz frequency band or the 6 GHz frequency band.

(2) After the channel switch, a frequency spacing between the first link and the second link is greater than or equal to a first threshold.

(3) Before the channel switch, STR is between the first link and the second link, and after the channel switch, a frequency spacing between the first link and the second link remains unchanged or becomes larger.

For (1), (2), and (3) of the second condition, refer to related descriptions of (1), (2), and (3) of the first condition, and details are not described herein again.

Manner 3: When a third condition is met, the second MLD determines that NSTR is between the first link and the second link in the first time interval.

In some embodiments, the third condition includes: Before the channel switch, NSTR is between the first link and the second link, and after the channel switch, a frequency spacing between the first link and the second link remains unchanged or becomes smaller. For details, refer to related descriptions of (4) of the first condition. Details are not described herein again.

It should be noted that, in an actual application, the method for implementing the first MLD and the method for implementing the second MLD provided above may be used at the same time. For example, the first MLD uses the transmitting manner in the case 1, and the second MLD uses the determining manner provided in the manner 1. Alternatively, the first MLD uses the transmitting manner in the case 1, and the second MLD uses the determining manner provided in the manner 2 or manner 3. Alternatively, the first MLD uses the transmitting manner in the case 2, and the second MLD uses the determining manner provided in the manner 1. Alternatively, the first MLD uses the transmitting manner in the case 2, and the second MLD uses the determining manner provided in the manner 2 or manner 3.

Alternatively, in an actual application, the foregoing implementation method for the first MLD and the implementation method for the second MLD that are provided above may be separately used. For example, the first MLD uses the transmitting manner in the case 1 or case 2, and the second MLD uses another determining manner other than the manners provided above. This is not limited in this application.

Based on the foregoing solution, in a channel switch scenario, the second MLD can learn of the NSTR capability after the channel switch, so that the first MLD and the second MLD can have a consistent understanding of the NSTR capability between links after the channel switch, thereby improving communication efficiency.

In addition to the channel switch, a change of an operation parameter (for example, a bandwidth) of the station may also cause the frequency spacing between links to change, and therefore affects the NSTR capability between links.

For example, the operation parameter is a bandwidth. It is assumed that NSTR is between a link 1 and a link 2 before the bandwidth changes. When a bandwidth of the link 1 changes from 320 megahertz (MHz) to 80 MHz, that is, the bandwidth decreases, a frequency spacing between the link 1 and the link 2 may become larger because the bandwidth of the link 1 decreases. Therefore, after the bandwidth changes, STR may be between the link 1 and the link 2.

Alternatively, it is assumed that STR is between the link 1 and the link 2 before the bandwidth changes. When the bandwidth of the link 1 changes from 80 MHz to 320 MHz, that is, the bandwidth increases, a frequency spacing between the link 1 and the link 2 may become smaller because the bandwidth of the link 1 increases. Therefore, after the bandwidth changes, NSTR may be between the link 1 and the link 2.

The following describes reporting of an NSTR capability in this scenario by using an example in which the first MLD changes a channel bandwidth of the first link.

It may be understood that, if updating of an operation mode parameter does not cause the NSTR capability to change, the first MLD may not transmit a management frame, or in other words, does not perform NSTR capability update reporting.

In some embodiments, when the first MLD decreases the channel bandwidth of the first link, the first MLD may first transmit a management frame to the second MLD to indicate the second NSTR capability, and then transmit first operation mode control information to the second MLD, to indicate that the channel bandwidth of the first link changes and a changed channel bandwidth is less than the channel bandwidth before changing. The second NSTR capability is an NSTR capability between the first link and the second link after the channel bandwidth of the first link changes.

Figure 10:
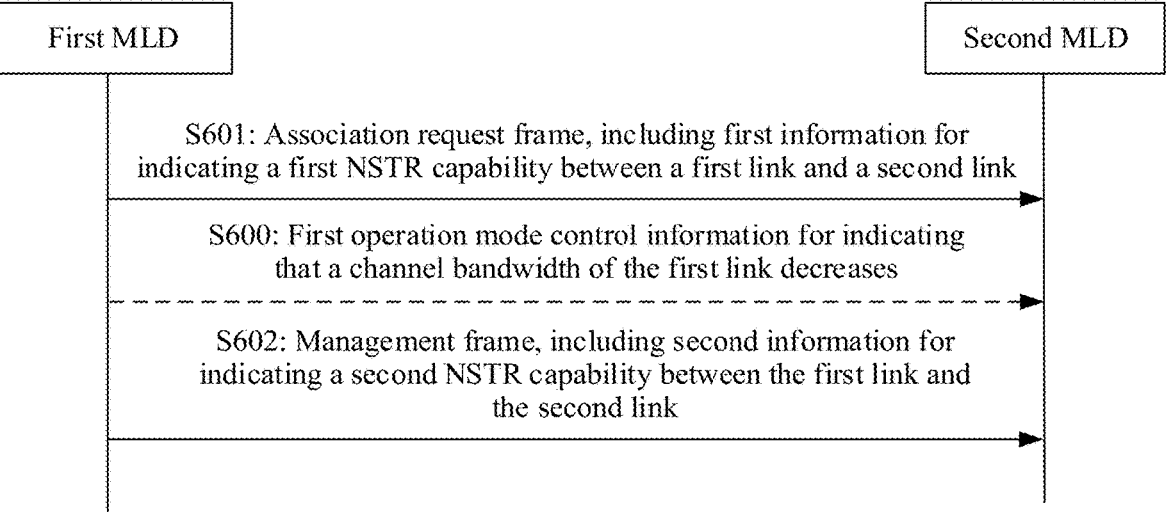
FIG. 10 is a schematic flowchart of a non-simultaneous transmitting and receiving capability indication method according to this application.

In other words, as shown in FIG. 10, before operation S602, the method may further include the following operation S600:

S600: The first MLD transmits the first operation mode control information to the second MLD. Correspondingly, the second MLD receives the first operation mode control information from the first MLD.

The first operation mode control information indicates that the channel bandwidth of the first link changes, and the changed channel bandwidth is less than the channel bandwidth before changing.

Further, the first MLD may first transmit the management frame to the second MLD to indicate the second NSTR capability, and after receiving an acknowledgment frame of the management frame, transmit the first operation mode control information to the second MLD.

In an embodiment, the first operation mode control information may be carried in an operation mode control subfield. Certainly, the information may alternatively be carried in another field. This is not limited in this application.

For example, the channel bandwidth of the first link before changing is 320 MHz, and the channel bandwidth of the first link after changing is 80 MHz. If NSTR is between the first link and the second link before changing, STR may be between the first link and the second link after changing. Assuming that the first operation mode control information and the management frame are carried in a same PPDU (or MAC frame), if the second MLD replies with an acknowledgment frame corresponding to the PPDU after receiving the PPDU, but the acknowledgment frame is not correctly received by the first MLD, according to an existing OM parameter update rule, because the first MLD does not receive the acknowledgment frame, after a TXOP for transmitting the PPDU, the first MLD still keeps the channel bandwidth of the first link unchanged at 320 MHz. In this case, NSTR is also kept between the first link and the second link. However, because the second MLD receives the PPDU, the second MLD may consider that the first MLD has adjusted the channel bandwidth of the first link to 80 MHz and that STR is between the first link and the second link. Therefore, the second MLD may communicate with the first MLD by using a procedure of STR, and finally, a communication failure may occur because the first MLD actually does not have the STR capability.

Therefore, if the first MLD decreases the channel bandwidth of the first link, it is unreasonable to carry, in the same PPDU (or MAC frame), the first operation mode control information and the management frame for indicating the second NSTR capability. In other words, the first operation mode control information and the management frame for indicating the second NSTR capability are separately carried in different PPDUs (or MAC frames) for transmitting. Further, the first operation mode control information may be first transmitted, and then the management frame for indicating the second NSTR capability is transmitted.

After the first operation mode control information is successfully transmitted and the channel bandwidth of the first link decreases, what is between the first link and the second link may change from NSTR to STR. In this case, because the management frame for indicating the second NSTR capability is transmitted after the first operation mode control information, a delay exists between a time point at which the second MLD receives the first operation mode control information and a time point at which the second MLD receives the management frame. Within the delay, the second MLD may consider that NSTR is still between the first link and the second link. Even if the second MLD communicates with the first MLD by using the procedure of NSTR within the delay, a communication failure does not occur. If a sequence of transmitting the first operation mode control information and transmitting the management frame is changed, a communication failure caused by that the two MLDs have different understandings of the NSTR capability between the first link and the second link may occur.

In other words, when the channel bandwidth of the link decreases, based on this solution, a communication failure caused by that the first MLD and the second MLD have different understandings of the NSTR capability between the first link and the second link can be avoided to a maximum extent.

In some other embodiments, when the first MLD increases the channel bandwidth of the first link, the first MLD may first transmit second operation mode control information to the second MLD, to indicate that the channel bandwidth of the first link changes and a changed channel bandwidth is greater than a channel bandwidth before changing. Then, the first MLD transmits the management frame to the second MLD, to indicate the second NSTR capability. The second NSTR capability is an NSTR capability between the first link and the second link after the channel bandwidth of the first link changes.

Figure 11:
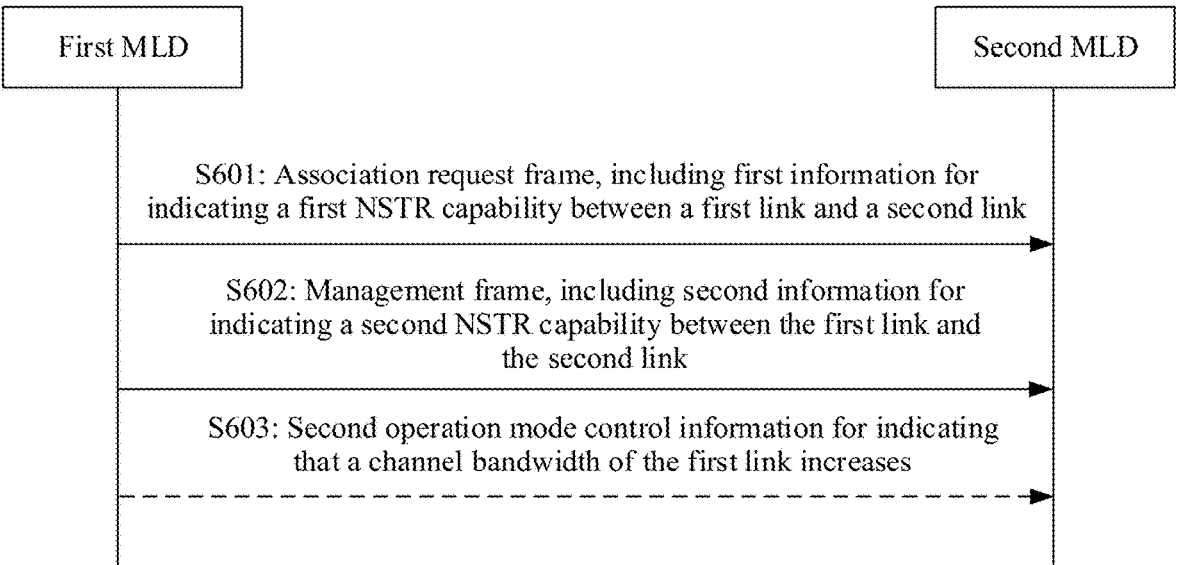
FIG. 11 is a schematic flowchart of a non-simultaneous transmitting and receiving capability indication method according to this application.

In other words, as shown in FIG. 11, after operation S602, the method may further include the following operation S603:

S603: The first MLD transmits the second operation mode control information to the second MLD. Correspondingly, the second MLD receives the second operation mode control information from the first MLD.

The second operation mode control information indicates that the channel bandwidth of the first link changes, and the changed channel bandwidth is greater than the channel bandwidth before changing.

Further, the first MLD may first transmit the second operation mode control information to the second MLD, and after receiving an acknowledgment of the second operation mode control information, transmit the management frame to the second MLD to indicate the second NSTR capability.

In an embodiment, the second operation mode control information may be carried in an operation mode control subfield. Certainly, the information may alternatively be carried in another field. This is not limited in this application.

For example, the channel bandwidth of the first link before changing is 80 MHz, and the channel bandwidth of the first link after changing is 320 MHz. If STR is between the first link and the second link before changing, NSTR may be between the first link and the second link after changing. Assuming that the second operation mode control information and the management frame are carried in a same PPDU (or MAC frame), if the second MLD does not correctly receive the PPDU, and therefore does not reply with an acknowledgment frame corresponding to the PPDU, according to an existing OM parameter update rule, the first MLD adjusts the channel bandwidth of the first link to 80 MHz after a TXOP for transmitting the PPDU ends. In this case, what is between the first link and the second link change from STR to NSTR. However, because the second MLD does not receive the PPDU, the second MLD may consider that the channel bandwidth of the first link is still 80 MHz, and STR is still between the first link and the second link. Therefore, the second MLD may communicate with the first MLD by using a procedure of STR, and finally, a communication failure may occur because the first MLD actually does not have an STR capability.

Therefore, if the first MLD increases the channel bandwidth of the first link, it is unreasonable to carry, in the same PPDU (or MAC frame), the second operation mode control information and the management frame for indicating the second NSTR capability. In other words, the second operation mode control information and the management frame for indicating the second NSTR capability are separately carried in different PPDUs (or MAC frames) for transmitting. Further, the management frame for indicating the second NSTR capability may be first transmitted, and then the second operation mode control information is transmitted.

When the management frame for indicating the second NSTR capability is successfully transmitted, the channel bandwidth of the first link is still 80 MHz, and STR is still between the first link and the second link. In this case, because the second MLD successfully receives the management frame, the second MLD may consider that NSTR is between the first link and the second link, and therefore the second MLD communicates with the first MLD by using a procedure of NSTR. In this case, although the first MLD and the second MLD have different understandings of the NSTR capability between the first link and the second link, a communication failure can be avoided to a maximum extent. If a sequence of transmitting the second operation mode control information and transmitting the management frame is changed, a communication failure caused by that the two MLDs have different understandings of the NSTR capability between the first link and the second link may occur.

In other words, when the channel bandwidth of the link increases, based on this solution, a communication failure caused by that the first MLD and the second MLD have different understandings of the NSTR capability between the first link and the second link can be avoided to a maximum extent.

It may be understood that, in the foregoing embodiments, methods and/or operations implemented by the first MLD may also be implemented by a component (for example, a chip or a circuit) that may be used in the first MLD, and methods and/or operations implemented by the second MLD may also be implemented by a component (for example, a chip or a circuit) that may be used in the second MLD.

The foregoing mainly describes the solutions provided in this application from the perspective of interaction between devices. Correspondingly, this application further provides a communication apparatus, and the communication apparatus is configured to implement the foregoing methods. The communication apparatus may be the first MLD in the foregoing method embodiments, an apparatus including the first MLD, or a component that can be used in the first MLD. Alternatively, the communication apparatus may be the second MLD in the foregoing method embodiments, an apparatus including the second MLD, or a component that may be used in the second MLD.

It may be understood that, to implement the foregoing function, the communication apparatus includes a corresponding hardware structure and/or software module for performing each function. A person skilled in the art should easily be aware that, in combination with units and algorithm operations of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software function module. It should be noted that, in embodiments of this application, module division is an example, and is merely a logical function division. In actual implementation, another division manner may be used.

Figure 12:
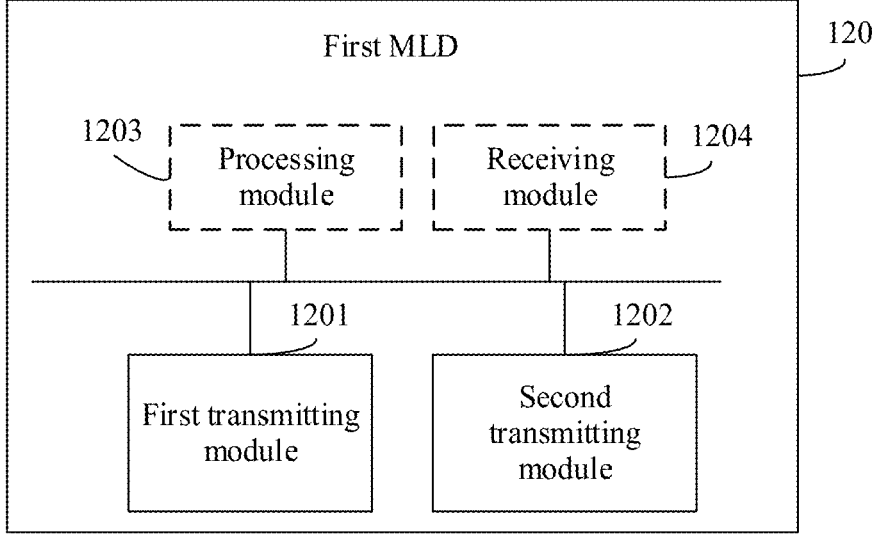
FIG. 12 is a schematic diagram of a structure of a first MLD according to this application.

In some embodiments, an example in which the communication apparatus is the first MLD in the foregoing method embodiment is used. FIG. 12 is a schematic diagram of a structure of the first MLD 120. The first MLD 120 includes a first transmitting module 1201 and a second transmitting module 1202. The first transmitting module 1201 and the second transmitting module 1202 may be collectively referred to as a transmitting module.

In some embodiments, the first MLD 120 may further include a processing module 1203.

In some embodiments, the first MLD 120 may further include a receiving module 1204. The receiving module 1204 and the transmitting module may be collectively referred to as a transceiver module.

In some embodiments, the receiving module 1204 may alternatively be referred to as a receiving unit. The transmitting module may alternatively be referred to as a transmitting unit. The receiving module 1204 may include a receiver circuit, a receiver, a receiver machine, or a communication interface. The transmitting module may include a transmitter circuit, a transmitter, a transmitter machine, or a communication interface.

In some embodiments, the first MLD 120 may further include a storage module (not shown in FIG. 12), configured to store a computer program or instructions.

In some embodiments, the receiving module 1204 may be configured to perform the receiving operations performed by the first MLD in the foregoing method embodiments, and/or configured to support another process of the technology described in this specification. The first transmitting module 1201 and the second transmitting module 1202 may be configured to perform the transmitting operations performed by the first MLD in the foregoing method embodiments, and/or configured to support another process of the technology described in this specification. The processing module 1203 may be configured to perform operations of processing (for example, generation and determining) performed by the first MLD in the foregoing method embodiments, and/or configured to support another process of the technology described in this specification.

In an example:

The first transmitting module 1201 is configured to transmit an association request frame to a second MLD, where the association request frame includes first information, and the first information indicates a first non-simultaneous transmitting and receiving NSTR capability between a first link and a second link; and the second transmitting module 1202 is configured to transmit a management frame to the second MLD, where the management frame includes second information, and the second information indicates a second NSTR capability between the first link and the second link.

In some embodiments, that the second transmitting module 1202 is configured to transmit a management frame to the second MLD includes: The second transmitting module 1202 is configured to: when the processing module 1203 determines that a channel switch occurs, transmit the management frame to the second MLD, where the second NSTR capability is an NSTR capability between the first link and the second link after the channel switch.

In some embodiments, that the second transmitting module 1202 is configured to transmit a management frame to the second MLD includes: The second transmitting module 1202 is configured to: when the processing module 1203 determines that a channel switch occurs and a first condition is not met, transmit the management frame to the second MLD, where the second NSTR capability is an NSTR capability between the first link and the second link after the channel switch.

In some embodiments, that the second transmitting module 1202 is configured to transmit a management frame to the second MLD includes: The second transmitting module 1202 is configured to transmit the management frame to the second MLD after the receiving module 1204 receives a channel switch announcement and before the processing module 1203 performs a channel switch, where the second NSTR capability is an NSTR capability between the first link and the second link after the channel switch.

In some embodiments, the second transmitting module 1202 is further configured to transmit first operation mode control information to the second MLD, where the first operation mode control information indicates that a channel bandwidth of the first link changes, and the changed channel bandwidth is less than the channel bandwidth before changing.

In some embodiments, the second transmitting module 1202 is further configured to transmit second operation mode control information to the second MLD, where the second operation mode control information indicates that a channel bandwidth of the first link changes and a changed channel bandwidth is greater than the channel bandwidth before changing.

All related content of the operations in the foregoing method embodiments may be cited in function descriptions of corresponding functional modules. Details are not described herein again.

In this application, the first MLD 120 is presented in a form of functional modules obtained through division in an integrated manner. The "module" herein may be an application-specific integrated circuit (ASIC), a circuit, a processor and a memory that execute one or more software or firmware programs, an integrated logic circuit, and/or another device that can provide the foregoing functions.

In some embodiments, for hardware implementation, a person skilled in the art may figure out that the first MLD 120 may be in a form of the WLAN device 500 shown in FIG. 5.

In an example, a function/an implementation process of the processing module 1203 in FIG. 12 may be implemented by the processor 501 in the WLAN device 500 shown in FIG. 5 by invoking computer-executable instructions stored in the memory 504, and a function/an implementation process of the receiving module 1204, the first transmitting module 1201, or the second transmitting module 1202 in FIG. 12 may be implemented by using the transceiver 502 in the WLAN device 500 shown in FIG. 5.

In some embodiments, when the first MLD 120 in FIG. 12 is a chip or a chip system, a function/implementation process of the receiving module 1204, the first transmitting module 1201, or the second transmitting module 1202 may be implemented by using an input/output interface (or a communication interface) of the chip or the chip system, and a function/implementation process of the processing module 1203 may be implemented by using a processor (or a processing circuit) of the chip or the chip system.

The first MLD 120 provided in this embodiment can perform the foregoing methods. Therefore, for a technical effect that can be achieved by the first MLD 120, refer to the foregoing method embodiments. Details are not described herein again.

Figure 13:
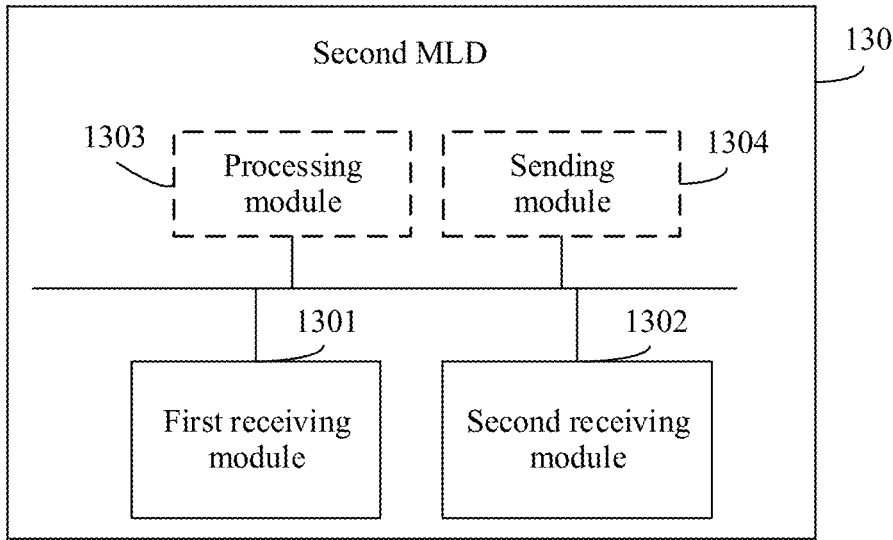
FIG. 13 is a schematic diagram of a structure of a second MLD according to this application.

In some embodiments, an example in which the communication apparatus is the second MLD in the foregoing method embodiment is used. FIG. 13 is a schematic diagram of a structure of the second MLD 130. The second MLD 130 includes a first receiving module 1301 and a second receiving module 1302. The first receiving module 1301 and the second receiving module 1302 may be collectively referred to as a receiving module.

In some embodiments, the second MLD 130 may further include a processing module 1303.

In some embodiments, the second MLD 130 may further include a transmitting module 1304. The transmitting module 1304 and the receiving module may be collectively referred to as a transceiver module.

In some embodiments, the receiving module may alternatively be referred to as a receiving unit. The transmitting module may alternatively be referred to as a transmitting unit. The receiving module may include a receiver circuit, a receiver, a receiver machine, or a communication interface. The transmitting module may include a transmitter circuit, a transmitter, a transmitter machine, or a communication interface.

In some embodiments, the second MLD 130 may further include a storage module (not shown in FIG. 13), configured to store a computer program or instructions.

In some embodiments, the first receiving module 1301 and the second receiving module 1302 may be configured to perform the receiving operations performed by the second MLD in the foregoing method embodiments, and/or configured to support another process of the technology described in this specification. The transmitting module 1304 may be configured to perform the transmitting operations performed by the second MLD in the foregoing method embodiments, and/or configured to support another process of the technology described in this specification. The processing module 1303 may be configured to perform operations of processing (for example, using) performed by the second MLD in the foregoing method embodiments, and/or configured to support another process of the technology described in this specification.

In an example:

The first receiving module 1301 is configured to receive an association request frame from a first MLD, where the association request frame includes first information, and the first information indicates a first non-simultaneous transmitting and receiving NSTR capability between a first link and a second link; and the second receiving module 1302 is configured to receive a management frame from the first MLD, where the management frame includes second information, and the second information indicates a second NSTR capability between the first link and the second link.

In some embodiments, the processing module 1303 is configured to determine that NSTR is between the first link and the second link in a first time interval, where the first time interval is a time interval from a time point at which a channel switch occurs to a time point at which the management frame is received; or the processing module 1303 is configured to: when a second condition is met, determine that STR is between the first link and the second link in the first time interval; or the processing module 1303 is configured to: when a third condition is met, determine that NSTR is between the first link and the second link in the first time interval.

In some embodiments, that the second receiving module 1302 is configured to receive a management frame from the first MLD includes: The second receiving module 1302 is configured to receive the management frame from the first MLD after the transmitting module 1304 transmits a channel switch announcement and before the processing module 1203 performs a channel switch, where the second NSTR capability is an NSTR capability between the first link and the second link after the channel switch.

In some embodiments, the second receiving module 1302 is further configured to receive first operation mode control information from the first MLD, where the first operation mode control information indicates a channel bandwidth of the first link, and a changed channel bandwidth is less than a channel bandwidth before changing.

In some embodiments, the second receiving module 1302 is further configured to receive second operation mode control information from the first MLD, where the second operation mode control information indicates that a channel bandwidth of the first link changes, and a changed channel bandwidth is greater than the channel bandwidth before changing.

All related content of the operations in the foregoing method embodiments may be cited in function descriptions of corresponding functional modules. Details are not described herein again.

In this application, the second MLD 130 is presented in a form of functional modules obtained through division in an integrated manner. The "module" herein may be an application-specific integrated circuit (ASIC), a circuit, a processor and a memory that execute one or more software or firmware programs, an integrated logic circuit, and/or another device that can provide the foregoing functions.

In some embodiments, for hardware implementation, a person skilled in the art may figure out that the second MLD 130 may be in a form of the WLAN device 500 shown in FIG. 5.

In an example, a function/an implementation process of the processing module 1303 in FIG. 13 may be implemented by the processor 501 in the WLAN device 500 shown in FIG. 5 by invoking computer-executable instructions stored in the memory 504, and a function/an implementation process of the transmitting module 1304, the first receiving module 1301, or the second receiving module 1302 in FIG. 13 may be implemented by using the transceiver 502 in the WLAN device 500 shown in FIG. 5.

In some embodiments, when the second MLD 130 in FIG. 13 is a chip or a chip system, a function/implementation process of the transmitting module 1304, the first receiving module 1301, or the second receiving module 1302 may be implemented by using an input/output interface (or a communication interface) of the chip or the chip system, and a function/implementation process of the processing module 1303 may be implemented by using a processor (or a processing circuit) of the chip or the chip system.

The second MLD 130 provided in this embodiment can perform the foregoing methods. Therefore, for a technical effect that can be achieved by the second MLD 130, refer to the foregoing method embodiments. Details are not described herein again.

In a possible product form, the first MLD and the second MLD in this embodiment of this application may be further implemented by using one or more field programmable gate arrays (FPGAs), a programmable logic device (PLD), a controller, a state machine, a gate logic, a discrete hardware component, any other proper circuit, or any combination of circuits that can perform various functions described in this application.

In some embodiments, an embodiment of this application further provides a communication apparatus. The communication apparatus includes a processor that is configured to implement the method in any one of the foregoing method embodiments.

In some embodiments, the communication apparatus further includes a memory. The memory is configured to store a computer program or instructions. The processor may invoke the computer program or instructions stored in the memory, to instruct the communication apparatus to perform the method in any one of the foregoing method embodiments. Certainly, the memory may alternatively not be in the communication apparatus.

In some embodiments, the communication apparatus further includes an interface circuit. The interface circuit is a code/data read/write interface circuit. The interface circuit is configured to: receive computer-executable instructions (the computer-executable instructions are stored in a memory, and may be directly read from the memory, or may be read via another component) and transmit the computer-executable instructions to the processor.

In still some embodiments, the communication apparatus further includes a communication interface, and the communication interface is configured to communicate with a module other than the communication apparatus.

It may be understood that the communication apparatus may be a chip or a chip system. When the communication apparatus is a chip system, the chip system may include a chip, or may include a chip and another discrete device. This is not limited in embodiments of this application.

In some embodiments, an embodiment of this application further provides a communication apparatus. The communication apparatus includes an interface circuit and a logic circuit. The interface circuit is configured to input information and/or output information. The logic circuit is configured to perform the method in any one of the foregoing method embodiments, to process input information and/or generate output information.

In some embodiments, when the communication apparatus is configured to implement the function of the first MLD:

In some embodiments, the input information is an association request frame and a management frame, where the association request frame includes first information, the first information indicates a first NSTR capability between a first link and a second link, the management frame includes second information, and the second information indicates a second NSTR capability between the first link and the second link.

In some embodiments, the input information is first operation mode control information, where the first operation mode control information indicates that a channel bandwidth of the first link changes, and a changed channel bandwidth is less than the channel bandwidth before changing.

In some embodiments, the input information is second operation mode control information, where the second operation mode control information indicates that a channel bandwidth of the first link changes, and a changed channel bandwidth is greater than the channel bandwidth before changing.

In some embodiments, when the communication apparatus is configured to implement the function of the second MLD:

In some embodiments, the output information is an association request frame and a management frame, where the association request frame includes first information, the first information indicates a first NSTR capability between a first link and a second link, the management frame includes second information, and the second information indicates a second NSTR capability between the first link and the second link.

In some embodiments, the output information is first operation mode control information, where the first operation mode control information indicates that a channel bandwidth of the first link changes, and a changed channel bandwidth is less than the channel bandwidth before changing.

In some embodiments, the output information is second operation mode control information, where the second operation mode control information indicates that a channel bandwidth of the first link changes, and a changed channel bandwidth is greater than the channel bandwidth before changing.

In a possible product form, the first MLD and the second MLD in embodiment of this application may be implemented by using a general bus architecture.

Figure 14:
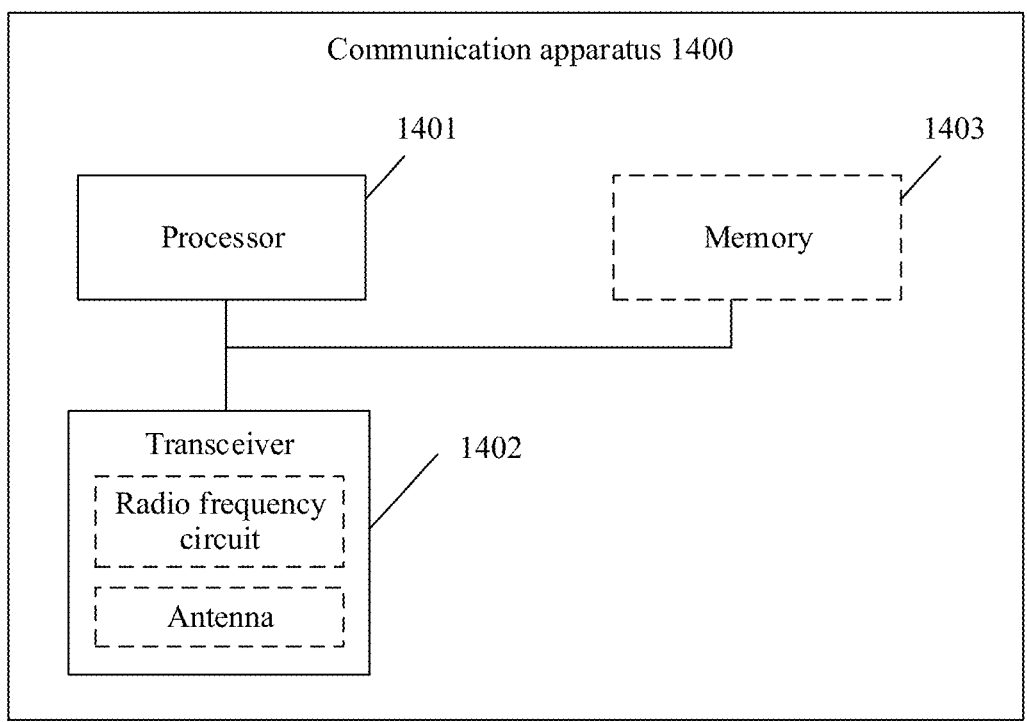
FIG. 14 is a schematic diagram of a structure of a communication apparatus according to this application.

For ease of description, refer to FIG. 14. FIG. 14 is a schematic diagram of a structure of a communication apparatus 1400 according to an embodiment of this application. The communication apparatus 1400 includes a processor 1401 and a transceiver 1402. The communication apparatus 1400 may be a first MLD or a second MLD, or a chip in the first MLD or the second MLD. FIG. 14 shows only main components of the communication apparatus 1400. In addition to the processor 1401 and the transceiver 1402, the communication apparatus may further include a memory 1403 and an input/output apparatus (not shown in the figure).

The processor 1401 is mainly configured to: process a communication protocol and communication data, control the entire communication apparatus, execute a software program, and process data of the software program. The memory 1403 is mainly configured to store a software program and data. The transceiver 1402 may include a radio frequency circuit and an antenna. The radio frequency circuit is mainly configured to: perform conversion between a baseband signal and a radio frequency signal, and process a radio frequency signal. The antenna is mainly configured to receive and transmit a radio frequency signal in a form of an electromagnetic wave. The input/output apparatus, such as a touchscreen, a display, or a keyboard, is mainly configured to: receive data input by a user and output data to the user.

The processor 1401, the transceiver 1402, and the memory 1403 may be connected through a communication bus.

After the communication apparatus is powered on, the processor 1401 may read the software program in the memory 1403, interpret and execute instructions of the software program, and process data of the software program. When data needs to be transmitted wirelessly, the processor 1401 performs baseband processing on the to-be-transmitted data, and then outputs a baseband signal to a radio frequency circuit. The radio frequency circuit performs radio frequency processing on the baseband signal, and then transmits, by using the antenna, a radio frequency signal in an electromagnetic wave form. When data is transmitted to the communication apparatus, the radio frequency circuit receives a radio frequency signal through the antenna, converts the radio frequency signal into a baseband signal, and outputs the baseband signal to the processor 1401. The processor 1401 converts the baseband signal into data, and processes the data.

In some embodiments, the radio frequency circuit and the antenna may be disposed independent of the processor that performs baseband processing. For example, in a distributed scenario, the radio frequency circuit and the antenna may be disposed remotely and independent of the communication apparatus.

This application further provides a computer-readable storage medium, where the computer-readable storage medium stores a computer program or instructions; and when the computer program or instructions are executed by a processor, functions of any one of the foregoing method embodiments is implemented.

This application further provides a computer program product. When the computer program product is executed by a processor, functions of any one of the foregoing method embodiments are implemented.

A person of ordinary skill in the art may understand that, for the purpose of convenient and brief description, for a detailed working process of the foregoing system, apparatus, and unit, refer to a corresponding process in the foregoing method embodiments. Details are not described herein again.

It may be understood that the system, apparatus, and method described in this application may alternatively be implemented in another manner. For example, the described apparatus embodiment is merely an example. For example, division into the units is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may be physically separated or not, this is, may be located together in the same place or distributed on multiple network units. Parts displayed as units may be or may not be physical units. Some or all of the units may be selected based on actual requirements to achieve the objectives of the solutions of embodiments.

In addition, functional units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When a computer program or instructions are loaded and executed on a computer, the procedure or functions according to the embodiments of this application are completely or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like. In embodiments of this application, the computer may include the apparatus described above.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" does not exclude another component or another operation, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method comprising:

transmitting, by a first multi-link device (MLD), an association request frame to a second MLD, wherein the association request frame comprises first information, and wherein the first information indicates a first non-simultaneous transmitting and receiving (NSTR) capability between a first link and a second link; and transmitting, by the first MLD, a management frame to the second MLD, wherein the management frame comprises second information carried in a multi-link element of the management frame, and wherein the second information comprises an NSTR indication bitmap that indicates a second NSTR capability between the first link and the second link.

2. The method according to claim 1, wherein the transmitting, by the first MLD, a management frame to the second MLD comprises:

when a channel switch occurs, transmitting, by the first MLD, the management frame to the second MLD, wherein the second NSTR capability is an NSTR capability between the first link and the second link after the channel switch.

3. The method according to claim 1, wherein the transmitting, by the first MLD, a management frame to the second MLD comprises:

when a channel switch occurs and a first condition is not met, transmitting, by the first MLD, the management frame to the second MLD, wherein the second NSTR capability is an NSTR capability between the first link and the second link after the channel switch.

4. The method according to claim 1, wherein the multi-link element is a basic variant multi-link element or an update variant multi-link element, the second information is carried in the multi-link element.

5. The method according to claim 4, wherein:

the multi-link element is an update variant multi-link element that comprises a multi-link control field and a link information field;

the multi-link control field comprises a type field that is set to a first value, and the multi-link control field does not comprise a first field that comprises at least one of the following: a multi-link device media access control address present field, a link identifier information present field, a change sequence present field, a multi-link capability present field, or an enhanced multi-link single-radio frequency (EMLSR) capability present field; and the link information field comprises an NSTR indication bitmap field, the second information is carried in the NSTR indication bitmap field, the link information field does not comprise a second field, and the second field comprises at least one of the following: a complete profile field, a station media access control address present field, a beacon interval present field, or a delivery traffic indication map (DTIM) information present field.

6. The method according to claim 5, wherein the link information field further comprises an NSTR link pair present field and an NSTR bitmap size field, the NSTR link pair present field indicates that the link information field comprises the NSTR indication bitmap field, and the NSTR bitmap size field indicates a size of the NSTR indication bitmap field.

7. The method according to claim 1, wherein:

the management frame comprises a third field; and when a value of the third field is a second value, it indicates that the management frame is used to update the NSTR capability between the first link and the second link.

8. A communication apparatus, comprising:

a communication interface configured to communicate with a module; and a processor coupled to the communication interface, wherein the processor is configured to run a computer program or instructions to make the communication apparatus perform following operations:

transmitting an association request frame from a first multi-link device (MLD) to a second MLD, wherein the association request frame comprises first information that indicates a first non-simultaneous transmitting and receiving (NSTR) capability between a first link and a second link; and transmitting a management frame from the first MLD to the second MLD, wherein the management frame comprises second information carried in a multi-link element of the management frame, and wherein the second information comprises an NSTR indication bitmap that indicates a second NSTR capability between the first link and the second link.

9. The communication apparatus according to claim 8, wherein the transmitting the management frame to the second MLD comprises:

when a channel switch occurs, transmitting the management frame to the second MLD, wherein the second NSTR capability is an NSTR capability between the first link and the second link after the channel switch.

10. The communication apparatus according to claim 8, wherein the multi-link element is a basic variant multi-link element or an update variant multi-link element.

11. The communication apparatus according to claim 10, wherein:

the multi-link element is a basic variant multi-link element that comprises a multi-link control field and a link information field;

the multi-link control field comprises a first field that is set to 0, and the first field comprises at least one of the following: a multi-link device media access control address present field, a link identifier information present field, a change sequence present field, a multi-link device capability present field, or an enhanced multi-link single-radio frequency (EMLSR) capability present field; and the link information field comprises an NSTR indication bitmap field, the second information is carried in the NSTR indication bitmap field, the link information field comprises a second field that is set to 0, and the second field comprises at least one of the following: a complete profile field, a media access control address present field, a beacon interval present field, or a delivery traffic indication map (DTIM) information present field.

12. The communication apparatus according to claim 10, wherein:

the multi-link element is an update variant multi-link element that comprises a multi-link control field and a link information field;

the multi-link control field comprises a type field that is set to a first value, and the multi-link control field does not comprise a first field, wherein the first field comprises at least one of the following: a multi-link device media access control address present field, a link identifier information present field, a change sequence present field, a multi-link capability present field, or an EMLSR capability present field; and the link information field comprises an NSTR indication bitmap field, the second information is carried in the NSTR indication bitmap field, the link information field does not comprise a second field, and the second field comprises at least one of the following: a complete profile field, a station media access control address present field, a beacon interval present field, or a DTIM information present field.

13. The communication apparatus according to claim 12, wherein the link information field further comprises an NSTR link pair present field and an NSTR bitmap size field, the NSTR link pair present field indicates that the link information field comprises the NSTR indication bitmap field, and the NSTR bitmap size field indicates a size of the NSTR indication bitmap field.

14. The communication apparatus according to claim 8, wherein the management frame comprises a third field; and when a value of the third field is a second value, it indicates that the management frame is used to update the NSTR capability between the first link and the second link.

15. A non-transitory computer-readable storage medium, comprising instructions, wherein when the instructions are run on a communication apparatus, the communication apparatus to perform the following steps:

transmitting an association request frame from a first multi-link device (MLD) to a second MLD, wherein the association request frame comprises first information, and wherein the first information indicates a first non-simultaneous transmitting and receiving (NSTR) capability between a first link and a second link; and transmitting a management frame to the second MLD, wherein the management frame comprises second information carried in a multi-link element of the management frame, and wherein the second information comprises an NSTR indication bitmap that indicates a second NSTR capability between the first link and the second link.

16. The non-transitory computer-readable storage medium according to claim 15, wherein the transmitting the management frame to the second MLD comprises:

when a channel switch occurs, transmitting the management frame to the second MLD, wherein the second NSTR capability is an NSTR capability between the first link and the second link after the channel switch.

17. The non-transitory computer-readable storage medium according to claim 15, wherein the multi-link element is a basic variant multi-link element or an update variant multi-link element.

18. The non-transitory computer-readable storage medium according to claim 17, wherein:

the multi-link element is an update variant multi-link element that comprises a multi-link control field and a link information field;

the multi-link control field comprises a type field that is set to a first value, and the multi-link control field does not comprise a first field, wherein the first field comprises at least one of the following: a multi-link device media access control address present field, a link identifier information present field, a change sequence present field, a multi-link capability present field, or an EMLSR capability present field; and the link information field comprises an NSTR indication bitmap field, the second information is carried in the NSTR indication bitmap field, the link information field does not comprise a second field, and the second field comprises at least one of the following: a complete profile field, a station media access control address present field, a beacon interval present field, or a delivery traffic indication map (DTIM) information present field.

19. The non-transitory computer-readable storage medium according to claim 18, wherein the link information field further comprises an NSTR link pair present field and an NSTR bitmap size field, the NSTR link pair present field indicates that the link information field comprises the NSTR indication bitmap field, and the NSTR bitmap size field indicates a size of the NSTR indication bitmap field.

20. The non-transitory computer-readable storage medium according to claim 15, wherein the management frame comprises a third field; and when a value of the third field is a second value, it indicates that the management frame is used to update the NSTR capability between the first link and the second link.

* * * * *